United States Patent
Sasaki et al.

(10) Patent No.: US 8,965,165 B2
(45) Date of Patent: Feb. 24, 2015

(54) MULTICORE FIBER

(71) Applicant: Fujikura Ltd., Tokyo (JP)

(72) Inventors: Yusuke Sasaki, Sakura (JP); Shoichiro Matsuo, Sakura (JP); Katsuhiro Takenaga, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 14/013,778

(22) Filed: Aug. 29, 2013

(65) Prior Publication Data

US 2014/0010507 A1 Jan. 9, 2014

Related U.S. Application Data

(63) Continuation of application No. PCT/JP2012/055135, filed on Feb. 29, 2012.

(30) Foreign Application Priority Data

Mar. 2, 2011 (JP) ................................ 2011-045751
Mar. 2, 2011 (JP) ................................ 2011-045752

(51) Int. Cl.
  *G02B 6/036* (2006.01)
  *G02B 6/02* (2006.01)

(52) U.S. Cl.
  CPC ........ *G02B 6/02042* (2013.01); *G02B 6/02366* (2013.01); *G02B 6/0365* (2013.01)
  USPC ........................................................ 385/126

(58) Field of Classification Search
  CPC .................................................. G02B 6/02042
  USPC ........................................................ 385/126
  See application file for complete search history.

(56) References Cited

U.S. PATENT DOCUMENTS

| 5,519,801 | A | 5/1996 | Le Noane et al. |
| 6,711,333 | B2 * | 3/2004 | West et al. ................... 385/126 |
| 8,285,094 | B2 * | 10/2012 | Takenaga et al. ............. 385/100 |

(Continued)

FOREIGN PATENT DOCUMENTS

| CN | 201083847 Y | 7/2008 |
| CN | 201107425 Y | 8/2008 |

(Continued)

OTHER PUBLICATIONS

Katsunori Imamura et al., "Trench Assisted Multi-Core Fiber with Large Aeff over 100 um2 and Low Attenuation Loss", ECOC Technical Digest, Jul. 2011.*

(Continued)

*Primary Examiner* — Charlie Peng
(74) *Attorney, Agent, or Firm* — Westerman, Hattori, Daniels & Adrian, LLP

(57) ABSTRACT

A multicore fiber includes a cladding and a plurality of core elements which is provided in the cladding and includes a core, an inner cladding layer that surrounds the core, and a low-refractive index layer that surrounds the inner cladding layer and has a lower average refractive index than the cladding and the inner cladding layer. The plurality of core elements is arranged such that a specific core element is surrounded by three or more core elements, and a low-refractive index layer of a partial core element of the plurality of core elements is configured to have larger light confinement loss in the core than low-refractive index layers of the other partial core elements.

18 Claims, 23 Drawing Sheets

(56) References Cited

U.S. PATENT DOCUMENTS

| | | | |
|---|---|---|---|
| 8,406,595 B2* | 3/2013 | Hayashi | 385/126 |
| 2002/0176677 A1 | 11/2002 | Kumar et al. | |
| 2010/0118897 A1* | 5/2010 | Tanigawa et al. | 372/6 |
| 2010/0195965 A1 | 8/2010 | Sasaoka | |
| 2011/0182557 A1 | 7/2011 | Hayashi | |
| 2011/0206330 A1* | 8/2011 | Sasaoka | 385/126 |

FOREIGN PATENT DOCUMENTS

| | | |
|---|---|---|
| CN | 101285910 A | 10/2008 |
| CN | 101620295 A | 1/2010 |
| CN | 101840022 A | 9/2010 |
| CN | 101852889 A | 10/2010 |
| JP | 2002-267866 A | 9/2002 |
| JP | 2005-338435 A | 12/2005 |
| WO | 2010/082656 A1 | 7/2010 |

OTHER PUBLICATIONS

Tetsuya Hayashi et al., "Characterization of Crosstalk in Ultra-Low-Crosstalk Multi-Core Fiber", J. of Lightwave Tech., vol. 30, No. 4, Feb. 2012.*

Tetsuya Hayashi et al., "Design and fabrication of ultra-low crosstalk and low-loss multi-core fiber", Optics Express, vol. 19, No. 17, Aug. 2011.*

International Search Report dated Jun. 5, 2012, issued in corresponding application No. PCT/JP2012/055135.

Extended European Search Report dated Sep. 30, 2014, issued in European Patent Application No. 12752845.3 (7 pages).

Fini M. J. et al., "Statistics of crosstalk in bent multicore fibers", Optics Express, vol. 18, No. 14, Jun. 30, 2010, pp. 15122-15129, XP055141795, cited in Extended European Search Report dated Sep. 30, 2014.

* cited by examiner

MULTICORE FIBER

TECHNICAL FIELD

The present invention relates to a multicore fiber capable of suppressing the cutoff wavelength of a specific core from increasing while reducing crosstalk.

BACKGROUND ART

Currently, an optical fiber used in an optical fiber communication system that is widely used has such a structure that the circumference of one core is surrounded by a cladding, and an optical signal propagates through the core, whereby information is transmitted. With the spread of the optical fiber communication system in recent years, the amount of transmitted information is increasing dramatically. With an increase in the amount of transmitted information, a large number of optical fibers ranging from several tens to several hundreds are used in the optical fiber communication system, to thereby enable large-volume and long-distance optical communication.

In order to decrease the number of optical fibers used in such an optical fiber communication system, a technique of transmitting a plurality of signals via light that propagates through cores of a multicore fiber in which the circumferences of a plurality of cores are surrounded by one cladding is known.

However, in the multicore fiber, inter-core crosstalk may occur. Thus, when the diameter of the multicore fiber decreases, since the inter-core distance decreases, the crosstalk occurs more easily. Thus, there is a demand for a multicore fiber that can reduce inter-core crosstalk.

Patent Document 1 described below discloses an example of a multicore fiber that can reduce such inter-core crosstalk. In this multicore fiber, a plurality of cores are disposed in the cladding, and a leakage reducing portion (low-refractive index layer) having a lower refractive index than the cladding is formed so as to surround the circumferential surface of each of the cores. Specifically, the circumferential surface of each of the cores is surrounded by an inner cladding layer having the same refractive index as the cladding, and the circumferential surface of each of the inner cladding layers is surrounded by the leakage reducing portion that has a lower refractive index than the cladding.

CITATION LIST

Patent Document

[Patent Document 1] WO 2010/082656 A

SUMMARY OF THE INVENTION

Objects to be Achieved by the Invention

With the configuration of Patent Document 1 described above, the inter-core crosstalk can be reduced. However, as a result of studies, the present inventors have found that, in the multicore fiber disclosed in Patent Document 1, the cutoff wavelength of a specific core may increase due to the arrangement of cores, and it is not possible to perform single-mode communication in the specific core under the same conditions as the other cores.

Therefore, an object of the present invention is to provide a multicore fiber capable of suppressing the cutoff wavelength of a specific core from increasing while reducing inter-core crosstalk.

Means for Achieving the Objects

The present inventors have intensively studied the causes of an increase in the cutoff wavelength of a specific core due to the arrangement of cores in a multicore fiber in which each core is surrounded by a low-refractive index layer. As a result, it was found that the phenomenon in which the cutoff wavelength increases occurs in a core that is located at a position where the core is surrounded by three or more cores. Thus, the present inventors have made a further progress in the studies and have reached the present invention.

Namely, a multicore fiber of the present invention includes: a cladding; and a plurality of core elements provided in the cladding, including a core, an inner cladding layer that surrounds the core, and a low-refractive index layer that surrounds the inner cladding layer and has a lower average refractive index than the cladding and the inner cladding layer, wherein the plurality of core elements is arranged so as to surround a specific core element by three or more core elements, and a low-refractive index layer of a partial core element of the plurality of core elements has larger light confinement loss in the core than low-refractive index layers of the other partial core elements.

According to such a multicore fiber, since each core is surrounded by a low-refractive index layer with an inner cladding layer interposed therebetween, the light confinement effect in each core is large, and light is unlikely to leak from the core. Thus, it is possible to reduce the inter-core crosstalk.

As described above, the present inventors have discovered such a tendency that, in a specific core element surrounded by three or more core elements, the cutoff wavelength thereof is longer than the other core elements (that is, the three or more core elements). The present inventors have thought that this results from the fact that, when the respective core elements have the same conditions, since light is confined by the own low-refractive index layer of the specific core element, and light is confined by the low-refractive index layers of a plurality of core elements that surround the specific core element, the own low-refractive index layer and the low-refractive index layers of the plurality of core elements that surround the specific core make light in high-order modes difficult to escape. However, according to a multicore fiber of the present invention, the own low-refractive index layer of a partial core element has larger light confinement loss than the other partial core elements. That is, in the partial core element, the effect of the low-refractive index layer confining light in the own core is weaker than that in the other partial core elements, and light can easily escape from the core element. Thus, in the partial core element, light in high-order modes can easily escape. This is because the intensity on the outer side in the radial direction of a core element is stronger in the fundamental mode than in the high-order modes. Thus, when the partial core element is the specific core element, in the specific core element, it is possible to take a balance between the easiness of the light in high-order modes to escape due to the large light confinement loss in the own core and the difficulty of the light in high-order modes to escape due to the low-refractive index layers of the other partial core elements that surround the specific core element. Thus, it is possible to suppress the cutoff wavelength of the specific core element from increasing. Further, when the light confinement loss is increased by the own low-refractive index layer, the light confining force near the low-refractive index layer weakens. Thus, when the partial core element is at least one of the three or more core elements that surround the specific core element, the light confinement loss in the specific core element increases near the core element having the large light confinement loss, and the light in high-order modes propagating from the specific core element can easily escape. Therefore, it is possible to suppress the cutoff wavelength of the specific core element from increasing. In this manner, according to the present invention, by increasing the light confinement loss in the core by the low-refractive index layer of the partial core element among the plurality of core elements, it is possible to suppress the cutoff wavelength of the specific core element from increasing. Thus, it is possible to suppress the cutoff wavelengths of the respective core elements from becoming different and to suppress the conditions for performing single-mode communication from becoming different in the respective core elements.

The low-refractive index layer may be formed of a material having a lower refractive index than the cladding and the inner cladding layer.

When the respective core elements are seen from the perspective of the refractive indices, since the low-refractive index layer has a groove shape, the refractive index of the low-refractive index layer is called a trench structure. With such a structure, it is possible to suppress bending loss of the fiber. Moreover, since a mass production method is well established, it is possible to easily manufacture the fiber at a low cost.

In this case, the low-refractive index layer of the partial core element may have a higher refractive index than the low-refractive index layers of the other partial core elements.

With such a configuration, the low-refractive index layer of the partial core element has larger light confinement loss in the core than the low-refractive index layers of the other partial core elements. Such a configuration can be realized just by changing the material of the low-refractive index layer of the partial core element with the material of the low-refractive index layers of the other partial core elements, and the respective core elements can have the same size. Thus, the degree of freedom in design is improved.

The low-refractive index layer of the partial core element may be thinner than the low-refractive index layers of the other partial core elements.

With such a configuration, the low-refractive index layer of the partial core element has larger light confinement loss in the core than the low-refractive index layers of the other partial core elements, and the low-refractive index layer of the partial core element can be formed of the same material as that of the low-refractive index layers of the other partial core elements. Thus, the degree of freedom in selecting the material of the low-refractive index layer is improved.

The low-refractive index layer may include a plurality of low refractive index portions which have a lower refractive index than the cladding and the inner cladding layer and surround the inner cladding layer.

Since the low refractive index portion of the low-refractive index layer is not formed continuously in a circular form so as to surround the core, it is possible to increase the high-order mode light confinement loss in the respective cores and to suppress the cutoff wavelengths of the respective cores from increasing.

In this case, the number of low refractive index portions of the partial core element may be smaller than the number of low refractive index portions of the other partial core elements.

With this configuration, the low-refractive index layer of the partial core element has larger light confinement loss in the core than the low-refractive index layers of the other partial core elements. Further, by decreasing the number of low refractive index portions of the partial core element, it is possible to decrease man-hours forming the low refractive index portion and to form the low-refractive index layer of the specific core element more easily. With such a structure, when the low refractive index portion is a glass in which impurities such as fluorine that reduce the refractive index are contained, since the number of expensive glass can be reduced, it is possible to manufacture the multicore fiber at a low cost. Further, if the low refractive index portion is a hole, when a hole is formed in the fiber base member of the multicore fiber by drilling, it is possible to reduce the drilling cost. When a hole is formed in the fiber base member using a glass tube, it is possible to decrease the number of glass tubes and to reduce the cost.

The low refractive index portion of the partial core element may have a smaller cross-sectional area than the low refractive index portions of the other partial core elements.

With such a configuration, the low-refractive index layer of the partial core element has larger light confinement loss in the core than the low-refractive index layers of the other partial core elements. For example, when the low refractive index portion is formed of quartz in which impurities such as fluorine that decreases the refractive index are added, since the amount of fluorine-contained quartz used for the low refractive index portion can be reduced, it is possible to manufacture the multicore fiber at a low cost.

The low refractive index portions may be holes. In this case, the refractive index of the low-refractive index layer can be further decreased, and the crosstalk can be further reduced.

The low refractive index portion of the partial core element may have a higher refractive index than the low refractive index portions of the other partial core elements.

With such a configuration, the respective core elements can have the same size just by changing the material of the low refractive index portion of the partial core element with the material of the low refractive index portions of the other partial core elements. Thus, the degree of freedom in design is improved.

In this case, the low refractive index portions of the other partial core elements may be holes.

Further, at least one of the low refractive index portions may be disposed on a straight line that connects the core of the own core element and the cores of the other core elements.

With such a configuration, the low refractive index portion is interposed between cores, and the inter-core crosstalk can be further suppressed.

Alternatively, the multicore fiber according to the present invention includes a cladding and a plurality of core elements provided in the cladding. The plurality of core elements include a partial core element and the other partial core elements and is arranged such that a specific core element is surrounded by three or more core elements, the other partial core elements include a core, an inner cladding layer that surrounds the core, and a low-refractive index layer that surrounds the inner cladding layer and has a lower average refractive index than the cladding and the inner cladding layer. The partial core element has a core and does not have the low-refractive index layer.

In the multicore fiber in which each of the plurality of core elements has a low-refractive index layer, by increasing the refractive index of the low-refractive index layer of the partial core element up to the same refractive index as the cladding, a structure in which the partial core element does not have a low-refractive index layer is realized. With such a structure in which the partial core element does not have a low-refractive index layer, the partial core element has large light confinement loss in the core. Thus, such a multicore fiber has the same technical feature as the multicore fiber in which each of the plurality of core elements has the low-refractive index layer. When the partial core element does not have a low-refractive index layer, the partial core element does not have the light confining effect provided by the low-refractive index layer, and light is confined in the core by the light confining effect provided by the core. In the multicore fiber having such a configuration, at least the cladding and the low-refractive index layer of the core element that surrounds the specific core are present between the partial core element and the other partial core elements. Thus, it is possible to reduce the crosstalk at least between the partial core element and the other partial core elements and between the other partial core elements.

Moreover, when the partial core element is the specific core element, since the effect of confining light in the own core of the specific core element is obtained by the core only, it is possible to take a balance between the easiness of the light in high-order modes to escape due to the large light confinement loss of the specific core element and the difficulty of the light in high-order modes to escape due to the low-refractive index layers of the other partial core elements that surround the specific core element. Thus, it is possible to prevent the cutoff wavelength of the specific core element from increasing. Moreover, when the partial core element is at least one of the three or more core elements that surround the specific core element, the light in high-order modes can easily escape from the vicinity of the core element. Thus, it is possible to suppress the cutoff wavelength of the specific core element from increasing. In this manner, even when the partial core element does not have the low-refractive index layer, it is possible to suppress the cutoff wavelength of the specific core element from increasing. Thus, it is possible to suppress the cutoff wavelengths of the respective core elements from becoming different and to suppress the conditions for performing single-mode communication from becoming different in the respective core elements.

Further, since the partial core element does not have the low-refractive index layer and has a simple configuration, it is possible to easily form the partial core element.

In this case, the low-refractive index layer may be formed of a material having a lower refractive index than the cladding and the inner cladding layer.

With such a structure, it is possible to suppress bending loss of the fiber in the other partial core elements and to easily manufacture the fiber at a low cost because a mass production method is well established.

Alternatively, the low-refractive index layer may include a plurality of low refractive index portions that have a lower refractive index than the cladding and the inner cladding layer and surround the inner cladding layer.

According to such a structure, since the low refractive index portion having a low refractive index is not formed continuously in a circular form so as to surround the core, it is possible to increase the high-order mode light confinement loss in the other partial core elements and to suppress the cutoff wavelengths of the cores of the other partial core elements from increasing.

In this case, the low refractive index portions may be holes. In this case, the refractive index of the low-refractive index layer can be further decreased, and the crosstalk can be further reduced.

At least one of the low refractive index portions may be disposed on a straight line that connects the core of the own core element and the cores of the other core elements. In this case, the low refractive index portion interposed between cores further suppresses the inter-core crosstalk.

In any one of the multicore fibers described above, the partial core element may be the specific core element.

According to the multicore fiber having such a configuration, the own low-refractive index layer of the specific core element has larger light confinement loss than the three or more core elements that surround the specific core element. That is, in the specific core element, the effect of confining light in the own core is weaker than that in the three or more core elements that surround the specific core element, and light can easily escape from the core element. Thus, in the specific core element, the light in high-order modes of which the intensity on the outer side in the radial direction is stronger than that of the fundamental mode can easily escape. In this manner, it is possible to take a balance between the easiness of the light in high-order modes of the specific core element to escape and the difficulty of the light in high-order modes to escape due to the low-refractive index layers of the respective core elements that surround the specific core element. Thus, it is possible to prevent the cutoff wavelength of the specific core element from increasing. Thus, it is possible to suppress the cutoff wavelengths of the respective core elements from becoming different and to suppress the conditions for performing single-mode communication from becoming different in the respective core elements.

Alternatively, in any one of the multicore fibers described above, the partial core element may be at least one of the three or more core elements that surround the specific core element.

In such a case, as described above, the light confinement loss between the partial core elements and between the partial core element and the other partial core elements is larger than that between the other partial core elements, and light can easily escape from such positions. Thus, since the partial core element is at least one of the three or more core elements that surround the specific core element, the light in high-order modes of the specific core element can escape from between the partial core elements and between the partial core element and the other partial core elements. Thus, it is possible to prevent the cutoff wavelength of the specific core element from increasing. Thus, it is possible to suppress the cutoff wavelengths of the respective core elements from becoming different and to suppress the conditions for performing single-mode communication from becoming different in the respective core elements.

Further, the partial core element may include all of the three or more core elements that surround the specific core element.

In this case, it is possible to allow the light in high-order modes of the specific core element to more easily escape from the vicinity of each of the three or more core elements that surround the specific core element while suppressing the crosstalk between the specific core element and the three or more core elements. Thus, it is possible to suppress the cutoff wavelengths of the respective core elements from becoming different.

Alternatively, the partial core element and the other partial core element may be alternately arranged in the three or more core elements that surround the specific core element.

In this case, the locations where light can easily escape in regions between the three or more core elements that surround the specific core element can be arranged so as to be symmetrical about the specific core element while suppressing the crosstalk between three or more core elements. Thus, the light in the specific core element can be suppressed from being unevenly distributed in the radial direction of the core.

The three or more core elements that surround the specific core element may be arranged such that the centers of the core elements are arranged at equal intervals.

Alternatively, the three or more core elements that surround the specific core element may be arranged such that the centers of four or more core elements form a rectangle.

Effect of the Invention

As described above, according to the present invention, a multicore fiber capable of suppressing the cutoff wavelength of a specific core from increasing while reducing inter-core crosstalk is provided.

EMBODIMENT OF THE INVENTION

Hereinafter, preferred embodiments of the multicore fiber according to the present invention will be described in detail with reference to the drawings.

First Embodiment

Figure 1A:
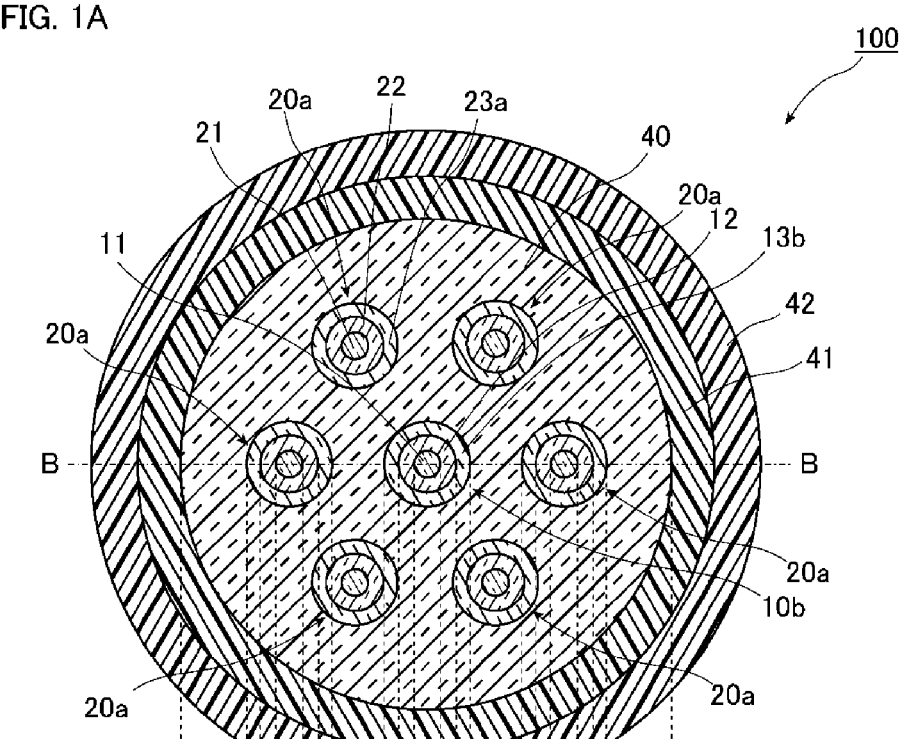
FIGS. 1A and 1B are a diagram illustrating a configuration of a multicore fiber according to a first embodiment of the present invention.
Figure 1B:
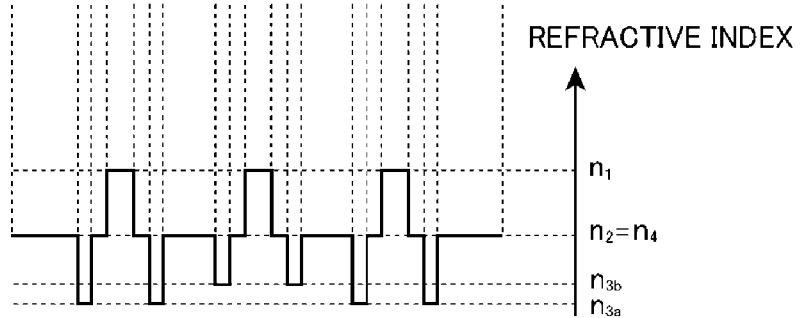

FIGS. 1A and 1B are a diagram illustrating a configuration of a multicore fiber 100 according to a first embodiment of the present invention. Specifically, FIG. 1A is a diagram illustrating a cross-sectional structure vertical to a longitudinal direction of the multicore fiber 100, and FIG. 1B is a diagram illustrating a refractive index distribution along a line B-B of the multicore fiber 100 illustrated in FIG. 1A.

As illustrated in FIG. 1A, the multicore fiber 100 according to the present embodiment includes a cladding 40, a specific core element 10b disposed at the center in the radial direction of the cladding 40, three or more core elements 20a disposed in the cladding 40 so as to surround the core element 10b, an inner protective layer 41 that covers the circumferential surface of the cladding 40, and an outer protective layer 42 that covers the circumferential surface of the inner protective layer 41. FIG. 1A illustrates a case where one core element 10b is surrounded by six core elements 20a.

The core element 10b includes a core 11, an inner cladding layer 12 that surrounds the circumferential surface of the core 11, and a low-refractive index layer 13b which surrounds the circumferential surface of the inner cladding layer 12 and of which the circumferential surface is surrounded by the cladding 40. The respective core elements 20a are disposed in the cladding 40 so that the centers thereof are arranged at equal intervals. Moreover, the respective core elements 20a have the same structure as the core element 10b, and each include the same core 21 as the core 11, an inner cladding layer 22 that surrounds the circumferential surface of the core 21 and has the same structure as the inner cladding layer 12, and a low-refractive index layer 23a which surrounds the circumferential surface of the inner cladding layer 22 and of which the circumferential surface is surrounded by the cladding 40. In the present embodiment, the diameters of the respective cores 11 and 21 of the core elements 10b and 20a are the same, the outer diameters of the respective inner cladding layers 12 and 22 are the same, and the outer diameters of the respective low-refractive index layers 13b and 23a are the same. Thus, the thicknesses of the respective inner cladding layers 12 and 22 are the same, and the thicknesses of the respective low-refractive index layers 13b and 23a are the same. Although the sizes of the respective members that constitute the multicore fiber 100 are not particularly limited, for example, the cores 11 and 21 have a diameter of 8.2 µm, the inner cladding layers 12 and 22 have an outer diameter of 19 µm, the low-refractive index layers 13b and 23a have an outer diameter of 27 µm, the cladding 40 has a diameter of 150 µm, the inner protective layer 41 has an outer diameter of 220 µm, and the outer protective layer 42 has an outer diameter of 270 µm.

In the present embodiment, the respective cores 11 and 21 of the core elements 10b and 20a have the same refractive index ($n_1$), and the respective inner cladding layers 12 and 22 have the same refractive index ($n_2$). As illustrated in FIGS. 1A and 1B, although the low-refractive index layers 23a of the core elements 20a have the same refractive index ($n_{3a}$), a refractive index $n_{3b}$ of the low-refractive index layer 13b of the core element 10b is higher than the refractive index $n_{3a}$ of the low-refractive index layer 23a of the core element 20a. Here, when the core elements 10b and 20a are classified according to the refractive index, the plurality of core elements 10b and 20a can be classified into a partial core element 10b and the other partial core elements 20a.

As illustrated in FIG. 1B, the refractive index $n_2$ of the inner cladding layers 12 and 22 and the refractive index $n_4$ of the cladding 40 are lower than the refractive index $n_1$ of the core 11, and the refractive indices $n_{3b}$ and $n_{3a}$ of the respective low-refractive index layers 13b and 23a are further lower than the refractive index $n_2$ of the inner cladding layers 12 and 22 and the refractive index $n_4$ of the cladding 40. That is, the respective refractive indices $n_1$ to $n_4$ satisfy the following relation:

$n_1 > n_2 > n_{3a}, n_{3b}$
$n_1 > n_4$
$n_{3a}, n_{3b} < n_4$ and
$n_{3a} < n_{3b}$.

In the present embodiment, the refractive index $n_2$ of the inner cladding layer 12 is the same as the refractive index $n_4$ of the cladding 40. That is, $n_2 = n_4$.

In this manner, when the respective core elements 10b and 20a are seen from the perspective of the refractive index, since the low-refractive index layers 13b and 23a of the core elements 10b and 20a have a groove shape, the respective core elements 10b and 20a have a trench structure. With such a trench structure, it is possible to suppress bending loss of the multicore fiber 100. Moreover, since a mass production method for the optical fiber having a trench structure is well established, it is possible to easily manufacture the multicore fiber 100 at a low cost. In the present embodiment, since the refractive indices of the respective low-refractive index layers 13b and 23a are uniform in the low-refractive index layers 13b and 23a, the refractive indices $n_{3b}$ and $n_{3a}$ of the low-refractive index layers 13b and 23a have the same meaning as an average refractive index.

In order for the multicore fiber 100 to have such a refractive index, the cores 11 and 21 are formed, for example, of quartz in which impurities such as germanium that increases the refractive index are added, and the inner cladding layers 12 and 22 and the cladding 40 are formed of pure quartz in which no impurities are added. Further, the low-refractive index layers 13b and 23a are formed of a material that has a lower refractive index than the cladding 40 and the inner cladding layers 12 and 22, for example, quartz in which impurities such as fluorine that decreases the refractive index are added, and the amounts of impurities added to the low-refractive index layer 13b and the low-refractive index layer 23a are different.

Moreover, the inner protective layer 41 and the outer protective layer 42 are formed of different types of ultraviolet-curable resins, for example.

Propagation characteristics of an optical fiber are defined by a relative refractive index difference Δ to the refractive index of the cladding 40 based on the above refractive index. When i=1, 2, 3a, and 3b, the relative refractive index difference $\Delta_i$ of a layer having a refractive index of $n_i$ to the cladding 40 is defined by the following expression.

$$\Delta_i = \frac{n_i^2 - n_4^2}{2n_i^2}$$

In the multicore fiber 100, since the refractive indices $n_{3b}$ and $n_{3a}$ of the low-refractive index layers 13b and 23a of the respective core elements 10b and 20a are lower than the refractive index $n_2$ of the inner cladding layer 12 and the refractive index $n_4$ of the cladding 40, the light confining effect in the core 11 increases, and light may not easily leak from the core 11. Thus, the light propagating through the core 11 can be prevented from leaking from the core elements 10b and 20a. Further, the low-refractive index layers 13b and 23a having a low refractive index and the cladding 40 become barriers, and the crosstalk between the cores 11 and 21 of the adjacent core elements 10b and 20a or between the cores 21 of the adjacent core elements 20a can be suppressed.

The relative refractive index difference of the cores 11 and 21 is defined by a mode field diameter MFD that a core should have as characteristics. Although in many cases, the relative refractive index difference of the inner cladding layers 12 and 22 to the cladding 40 is approximately zero as in the present embodiment, the relative refractive index difference is appropriately set to a positive or negative value for adjustment of wavelength dispersion characteristics. That is, the refractive index $n_2$ of the inner cladding layers 12 and 22 is set to be between the refractive index $n_1$ of the cores 11 and 21 and the refractive index $n_4$ of the cladding 40, or is set to be between the refractive indices $n_{3a}$ and $n_{3b}$ of the low-refractive index layers 13b and 23a and the refractive index $n_4$ of the cladding 40.

Moreover, as described above, the refractive index $n_{3b}$ of the low-refractive index layer 13b of the core element 10b is higher than the refractive index $n_{3a}$ of the low-refractive index layer 23a of the core element 20a and satisfies a relation of $n_{3a} < n_{3b}$.

Thus, the low-refractive index layer 13b of the specific core element 10b has larger light confinement loss in the core 11 than the low-refractive index layers 23a of the three or more core elements 20a that surround the specific core element 10b. That is, in the specific core element 10b, the effect of the low-refractive index layer confining light in the own core is weaker than that in the core elements 20a that surround the specific core element 10b, and light can easily escape from the core element 10b. Thus, in the specific core element 10b which is the partial core element, light in high-order modes can easily escape than the core elements 20a which are the other partial core elements.

Such a multicore fiber 100 is manufactured in the following manner. First, a specific core element glass member that becomes the core 11, the inner cladding layer 12, and the low-refractive index layer 13b and a plurality of core element glass members that become the core 21, the inner cladding layer 22, and the low-refractive index layer 23a are prepared. Further, these core element glass members are disposed in a cladding glass member that becomes the cladding 40 or a portion of the cladding 40 to allow the glass members to collapse, whereby a fiber base member of which the cross-sectional arrangement is similar to that of the multicore fiber 100 illustrated in FIG. 1A excluding the inner protective layer 41 and the outer protective layer 42 is manufactured. The manufactured fiber base member is heated, melted, and spun into a multicore fiber, and the multicore fiber is covered with the inner protective layer 41 and the outer protective layer 42 to obtain the multicore fiber 100. The core element glass member may be disposed in the cladding glass member that becomes the cladding 40 or a portion of the cladding 40 and spinning may be performed while allowing the glass members to collapse.

As described above, the multicore fiber 100 according to the present embodiment includes the cladding 40 and the plurality of core elements 10b and 20a that are provided in the cladding 40 and include the cores 11 and 21, the inner cladding layers 12 and 22 that surround the cores 11 and 21, and the low-refractive index layers 13b and 23a that surround the inner cladding layers 12 and 22 and have a lower average refractive index than the cladding 40 and the inner cladding layers 12 and 22. The plurality of core elements are disposed so that the specific core element 10b is surrounded by three or more core elements 20a. The low-refractive index layer of a partial core element of the plurality of core elements has larger light confinement loss in the core than the low-refractive index layers of the other partial core elements. The partial core element is the specific core element 10b, and the other partial core elements are the three or more core elements 20a that surround the specific core element 10b.

According to such a multicore fiber 100, it is possible to suppress inter-core crosstalk as described above.

Moreover, when the multicore fiber includes a plurality of core elements in which the core is surrounded by a low-refractive index layer as in the core elements 10b and 20a of the present embodiment, and the specific core element is surrounded by three or more core elements, the cutoff wavelength of the specific core element tends to increase. However, according to the multicore fiber 100 of the present embodiment, as described above, the own low-refractive index layer 13b of the specific core element 10b has larger light confinement loss than the three or more core elements 20a that surround the specific core element 10b. That is, in the specific core element 10b, the effect of the low-refractive index layer confining light in the own core is weaker than that in the three or more core elements 20a that surround the specific core element 10b, and light can easily escape from the core element 10b. Thus, light in high-order modes can easily escape from the specific core element 10b. On the other hand, the low-refractive index layers 23a of the core elements 20a that surround the core element 10b make the light in high-order modes difficult to escape from the specific core element 10b. Thus, in the specific core element 10b, it is possible to take a balance between the easiness of the light in high-order modes to escape due to the own low-refractive index layer 13b and the difficulty of the light in high-order modes to escape due to the low-refractive index layers 23a of the respective core elements 20a that surround the specific core element 10b. Thus, the cutoff wavelength of the specific core element 10b can be suppressed from increasing as compared to that of the core elements 20a that surround the core element 10b. In this manner, it is possible to suppress the cutoff wavelength of the respective core elements 10b and 20a from changing and to suppress the conditions for performing single-mode communication in the respective core elements 10b and 20a from changing.

In the present embodiment, as described above, the refractive index $n_{3b}$ of the low-refractive index layer 13b of the specific core element 10b is higher than the refractive index $n_{3a}$ of the three or more core elements 20a that surround the core element 10b, and the low-refractive index layer 13b of the core element 10b has higher light confinement loss in the core 11 than the low-refractive index layer 23a of the core element 20a. Thus, just by changing the material of the low-refractive index layer 13b of the specific core element 10b with the material of the low-refractive index layers 23a of the core elements 20a that surround the specific core element 10b, the respective core elements 10b and 20a can have the same size. Thus, the degree of freedom in design is improved.

Second Embodiment

Next, a second embodiment of the present invention will be described with reference to FIGS. 2A and 2B. The same or equivalent constituent elements as those of the first embodiment will be denoted by the same reference numerals unless otherwise particularly stated, and redundant description thereof will not be provided.

Figure 2A:
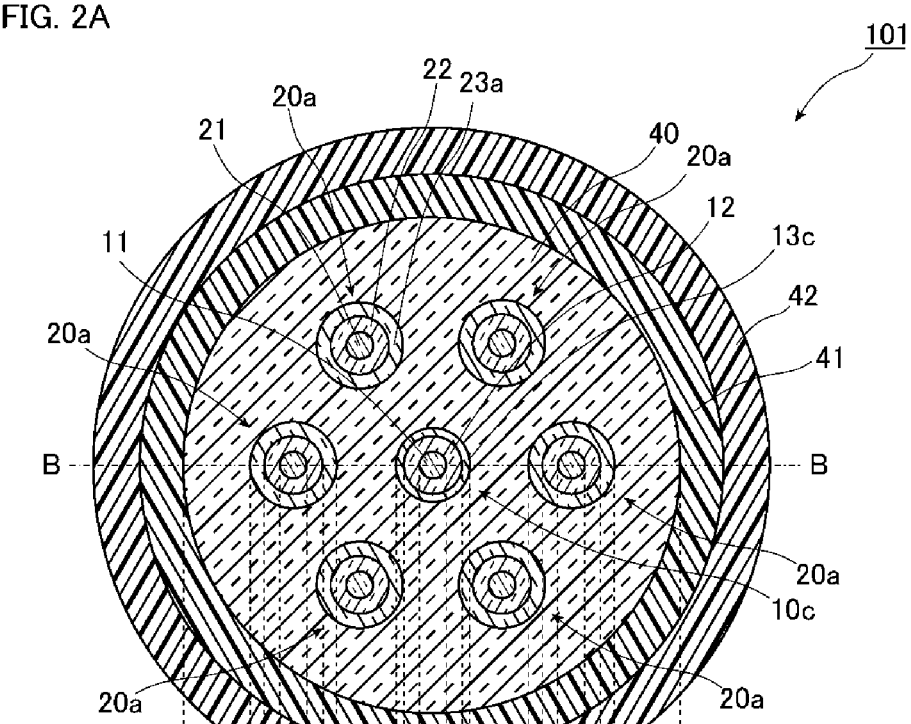
FIGS. 2A and 2B are a diagram illustrating a configuration of a multicore fiber according to a second embodiment of the present invention.
Figure 2B:
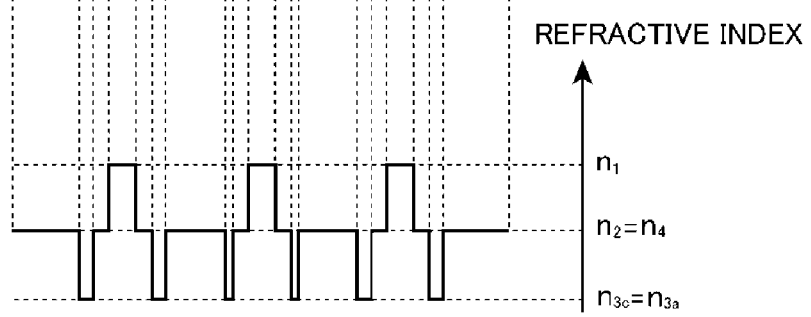

FIGS. 2A and 2B are a diagram illustrating a configuration of a multicore fiber 101 according to the second embodiment of the present invention. Specifically, FIG. 2A is a diagram illustrating a cross-sectional structure vertical to a longitudinal direction of the multicore fiber 101, and FIG. 2B is a diagram illustrating a refractive index distribution along a line B-B of the multicore fiber 101 illustrated in FIG. 2A.

As illustrated in FIG. 2A, the multicore fiber 101 according to the present embodiment is different from the multicore fiber 100 according to the first embodiment, in that the multicore fiber 101 includes a specific core element 10c that is disposed at the same position as the core element 10b instead of the specific core element 10b according to the first embodiment.

The specific core element 10c includes the same core 11 as the core 11 of the first embodiment, the same inner cladding layer 12 as the inner cladding layer 12 of the first embodiment, surrounding the circumferential surface of the core 11, and a low-refractive index layer 13c that surrounds the circumferential surface of the inner cladding layer 12. Moreover, as illustrated in FIG. 2B, the refractive index $n_{3c}$ of the low-refractive index layer 13c is the same as the refractive index $n_{3a}$ of the respective low-refractive index layers 23a of the three or more core elements 20a that surround the specific core element 10c. Further, the thickness $t_{3c}$ of the low-refractive index layer 13c is smaller than the thickness $t_{3a}$ of the low-refractive index layer 23a. Thus, the low-refractive index layer 13c of the specific core element 10c has larger light confinement loss in the core 11 than the low-refractive index layers 23a of the respective core elements 20a.

In the present embodiment, the outer diameter of the core element 10c is smaller than the outer diameter of the core element 20a by an amount corresponding to the difference between the thickness of the low-refractive index layer 13c and the thickness of the low-refractive index layer 23a. Here, when the respective core elements 10c and 20a are classified according to the cross-sectional structure of the core element, the core elements 10c and 20a can be classified into the partial core element 10c and the other partial core elements 20a.

Such a multicore fiber 101 may use the specific core element glass member that becomes the core 11, the inner cladding layer 12, and the low-refractive index layer 13c instead of the specific core element glass member that becomes the core 11, the inner cladding layer 12, and the low-refractive index layer 13b used in manufacturing of the multicore fiber 100.

According to the multicore fiber 101 of the present embodiment, as described above, since the low-refractive index layer 13c of the specific core element 10c is thinner than the low-refractive index layers 23a of the respective core elements 20a, the low-refractive index layer 13c of the core element 10c has larger light confinement loss in the core 11 than the low-refractive index layers 23a of the respective core elements 20a. Thus, in the specific core element 10c, the low-refractive index layer 13c makes the light in high-order modes easy to escape from the core 11, and the low-refractive index layers 23a of the respective core element 20a make the light in high-order modes difficult to escape. Thus, the cutoff wavelength of the core element 10c can be suppressed from increasing as compared to the core element 20a. With such a configuration, the low-refractive index layer 13c of the specific core element 10c can be formed of the same material as the low-refractive index layers 23a of the respective core elements 20a. Thus, the degree of freedom in selecting the material of the low-refractive index layer is improved.

Third Embodiment

Next, a third embodiment of the present invention will be described with reference to FIGS. 3A and 3B. The same or equivalent constituent elements as those of the first embodiment will be denoted by the same reference numerals unless otherwise particularly stated, and redundant description thereof will not be provided.

Figure 3A:
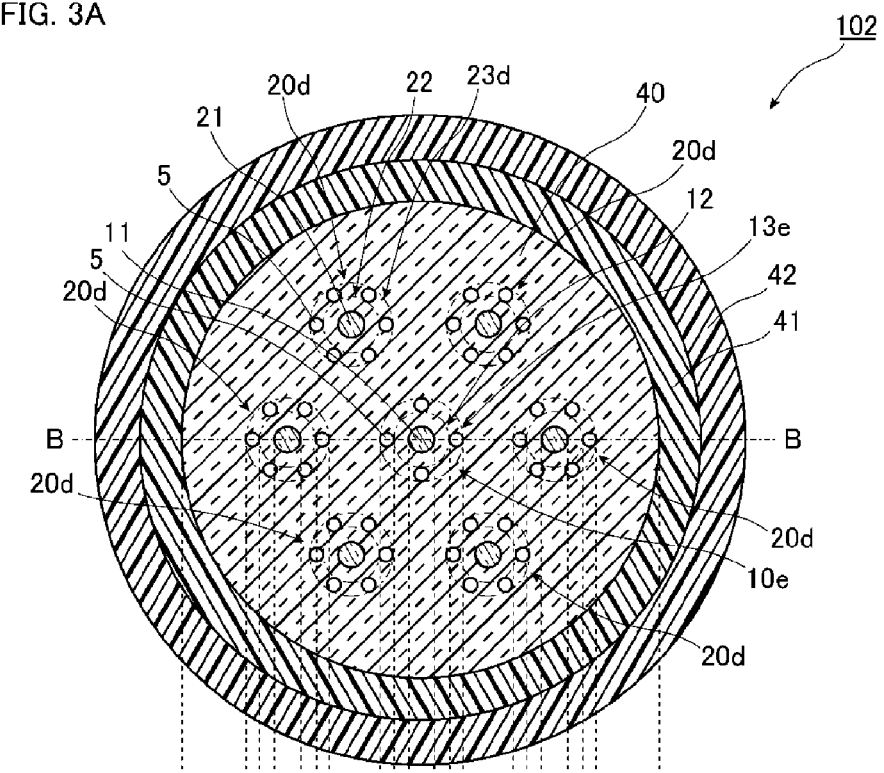
FIGS. 3A and 3B are a diagram illustrating a configuration of a multicore fiber according to a third embodiment of the present invention.
Figure 3B:
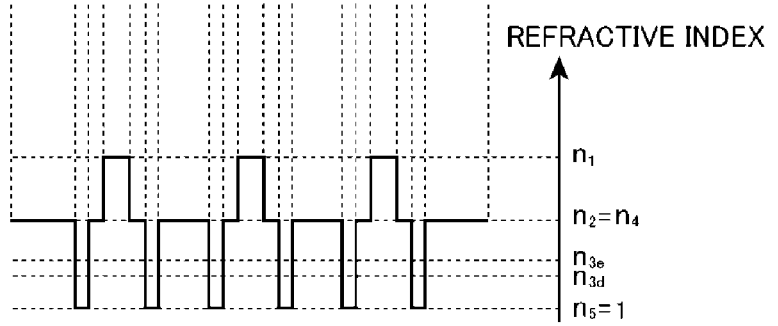

FIGS. 3A and 3B are a diagram illustrating a configuration of a multicore fiber 102 according to the third embodiment of the present invention. Specifically, FIG. 3A is a diagram illustrating a cross-sectional structure vertical to a longitudinal direction of the multicore fiber 102, and FIG. 3B is a diagram illustrating a refractive index distribution along a line B-B of the multicore fiber 102 illustrated in FIG. 3A.

As illustrated in FIGS. 3A and 3B, the multicore fiber 102 according to the present embodiment is different from the multicore fiber 100 according to the first embodiment, in that the multicore fiber 102 includes a specific core element 10e disposed at the same position as the core element 10b instead of the specific core element 10b of the first embodiment and includes three or more core elements 20d disposed at the same positions as the respective core elements 20a instead of the three or more core elements 20a of the first embodiment.

As illustrated in FIG. 3A, the core elements 10e and 20d include the same cores 11 and 21 as the core 11 of the first embodiment and the same inner cladding layers 12 and 22 as the inner cladding layers 12 and 22 of the first embodiment, surrounding the circumferential surfaces of the cores 11 and 21. Moreover, the core element 10e includes a low-refractive index layer 13e which surrounds the circumferential surface of the inner cladding layer 12 and of which the circumferential surface is surrounded by the cladding 40, and the core element 20d includes a low-refractive index layer 23d which surrounds the circumferential surface of the inner cladding layer 12 and of which the circumferential surface is surrounded by the cladding 40.

Each of the low-refractive index layers 13e and 23d includes a plurality of low refractive index portions 5 that has a lower refractive index than the cladding 40 and the inner cladding layers 12 and 22 and surrounds the inner cladding layers 12 and 22. In the present embodiment, a plurality of circular holes are formed in the low-refractive index layers 13e and 23d, and the holes are the low refractive index portions 5. Thus, the low refractive index portion 5 has a circular cross-sectional shape.

As illustrated in FIG. 3A, at least one of the plurality of low refractive index portions 5 of the respective core elements 10e and 20d is disposed on a straight line that connects the cores 11 and 21 of the own core elements and the cores 11 and 21 of the other core elements. Specifically, a partial low refractive index portion 5 of the plurality of low refractive index portions 5 of the core element 10e is disposed on a straight line that connects the core 11 of the own core element 10e and the core 21 of the core element 20d. Further, in the respective core elements 20d, one low refractive index portion 5 of the plurality of low refractive index portions 5 is disposed on a straight line that connects the core 21 of the own core element 20d and the core 11 of the core element 10e, and at least another low refractive index portion 5 of the plurality of low refractive index portions 5 is disposed on a straight line that connects the core 21 of the own core element 20d and the core 21 of the other core element 20d. In this manner, since the low refractive index portion 5 is interposed between the own core and the other cores, it is possible to further suppress the inter-core crosstalk.

In the present embodiment, the number of low refractive index portions 5 of the low-refractive index layer 13e of the specific core element 10e is smaller than the number of low refractive index portions 5 of the low-refractive index layer 23d of the core element 20d. Further, in the present embodiment, the regions of the respective low-refractive index layers 13e and 23d other than the low refractive index portion 5 are formed of the same material as the cladding 40 and the inner cladding layer 12. Moreover, as illustrated in FIG. 3B, since the low refractive index portion 5 is a hole, the refractive index $n_5$ of the low refractive index portion 5 is 1 and is lower than the refractive indices $n_2$ and $n_4$ of the inner cladding layers 12 and 22 and the cladding 40, the average refractive indices $n_{3e}$ and $n_{3d}$ of the low-refractive index layers 13e and 23d are lower than the inner cladding layer 12 and the cladding 40.

Since the number of low refractive index portions 5 of the low-refractive index layer 13e is smaller than the number of low refractive index portions 5 of the low-refractive index layer 23d, the average refractive index $n_{3e}$ of the low-refractive index layer 13e is higher than the average refractive index $n_{3d}$ of the low-refractive index layer 23d. In this manner, the low-refractive index layer 13e of the specific core element 10e has larger light confinement loss in the core 11 than the low-refractive index layers 23d of the respective core elements 20d.

Here, when the respective core elements 10e and 20d are classified according to the cross-sectional structure of the core element and the average refractive index of the low-refractive index layer, the core elements 10e and 20d can be classified into the partial core element 10e and the other partial core elements 20d.

As described above, although there are no boundaries between the regions of the low-refractive index layers 13e and 23d other than the low refractive index portion 5, and the inner cladding layer 12 and the cladding 40, the boundaries are depicted by imaginary lines in FIG. 3A for better understanding.

Such a multicore fiber 102 is manufactured in the following manner.

First, a specific core element glass member that becomes the core 11, the inner cladding layer 12, and the low-refractive index layer 13e, and a plurality of core element glass members that become the core 11, the inner cladding layer 12, and the low-refractive index layer 23d are prepared. The member that becomes the low-refractive index layers 13e and 23d is a glass tube that is disposed at the positions corresponding to the respective low refractive index portions so that the respective low refractive index portions (holes) are formed. These core element glass members are disposed in the cladding glass member that becomes the cladding 40 or a portion of the cladding 40 and are allowed to collapse with predetermined pressure applied to the penetration holes of the glass tubes, whereby a fiber base member of which the cross-sectional arrangement is similar to that of the multicore fiber 102 illustrated in FIG. 3A excluding the inner protective layer 41 and the outer protective layer 42 is manufactured. The manufactured fiber base member is heated, melted, and spun into a multicore fiber with predetermined pressure applied to the penetration holes, and the multicore fiber is covered with the inner protective layer 41 and the outer protective layer 42 to obtain the multicore fiber 102. The core element glass member may be disposed in the cladding glass member that becomes the cladding 40 or a portion of the cladding 40 and spinning may be performed with predetermined pressure applied to the penetration holes while allowing the glass members to collapse.

According to the multicore fiber 102 of the present embodiment, since the low refractive index portion 5 having a low refractive index is not formed continuously in a circular form so as to surround the respective cores 11 and 21, the light in high-order modes can appropriately escape from the respective cores 11 and 21. Thus, it is possible to suppress the cutoff wavelengths of the respective cores 11 from increasing.

In the present embodiment, by decreasing the number of low refractive index portions 5 of the specific core element 10e, it is possible to reduce the cost of providing the low refractive index portion 5 and to provide the low-refractive index layer 13e of the specific core element 10e easily. Specifically, if the low refractive index portion 5 is a hole, when the hole is formed by drilling in manufacturing of the fiber base member, it is possible to reduce the drilling cost. When the hole portion is manufactured using a glass tube, it is possible to reduce the number of glass tubes. In either case, it is possible to manufacture the fiber at a low cost.

In the present embodiment, although, since the low refractive index portion 5 is formed as a hole, the refractive index of the low refractive index portion 5 can be further decreased, the low refractive index portion 5 is not particular limited to a hole as long as the material of the low refractive index portion 5 has a lower refractive index than the inner cladding layer 12 and the cladding 40. For example, the low refractive index portion 5 can be formed of quartz in which impurities such as fluorine that decreases the refractive index are added. Even in this case, according to the multicore fiber 102 of the present embodiment, since the amount of quartz in which expensive fluorine is added can be decreased, it is possible to manufacture the multicore fiber 102 at a low cost.

Fourth Embodiment

Next, a fourth embodiment of the present invention will be described with reference to FIGS. 4A and 4B. The same or equivalent constituent elements as those of the third embodiment will be denoted by the same reference numerals unless otherwise particularly stated, and redundant description thereof will not be provided.

Figure 4A:
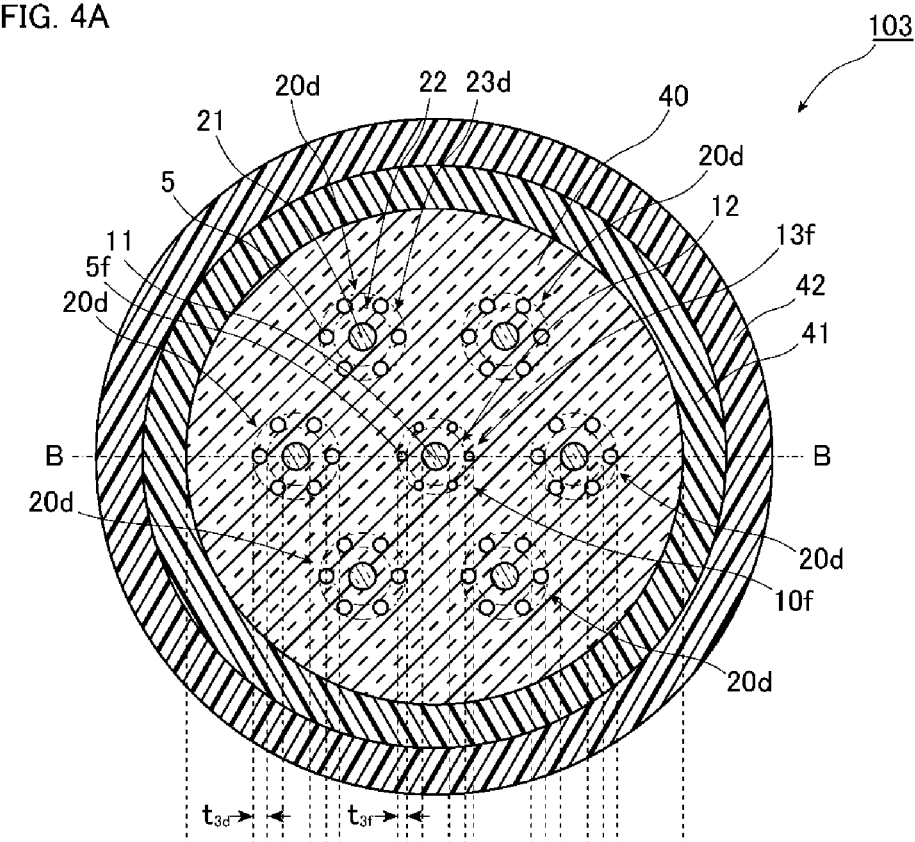
FIGS. 4A and 4B are a diagram illustrating a configuration of a multicore fiber according to a fourth embodiment of the present invention.
Figure 4B:
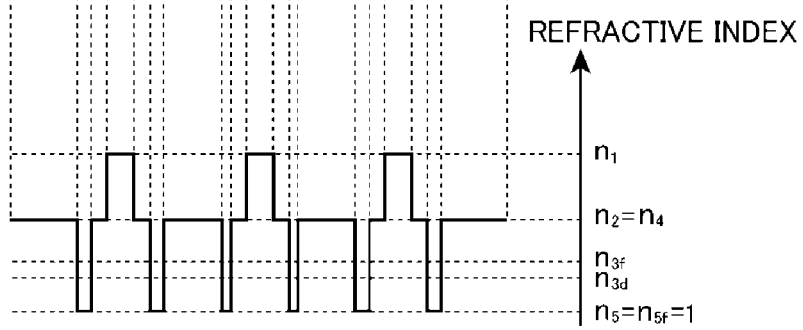

FIGS. 4A and 4B are a diagram illustrating a configuration of a multicore fiber 103 according to the fourth embodiment of the present invention. Specifically, FIG. 4A is a diagram illustrating a cross-sectional structure vertical to a longitudinal direction of the multicore fiber 103, and FIG. 4B is a diagram illustrating a refractive index distribution along a line B-B of the multicore fiber 103 illustrated in FIG. 4A.

As illustrated in FIGS. 4A and 4B, the multicore fiber 103 according to the present embodiment is different from the multicore fiber 102 according to the third embodiment, in that the multicore fiber 103 includes a specific core element 10f that is disposed at the same position as the core element 10e instead of the specific core element 10e according to the second embodiment.

The core element 10f includes the same core 11 as the core 11 of the third embodiment and the same inner cladding layer 12 as the inner cladding layer 12 of the third embodiment, surrounding the circumferential surface of the core 11. The core element 10f includes a low-refractive index layer 13f which surrounds the circumferential surface of the inner cladding layer 12 and of which the circumferential surface is surrounded by the cladding 40.

The low-refractive index layer 13f includes a plurality of low refractive index portions 5f which are formed as a hole having a circular cross-sectional shape. As described above, since the low refractive index portion 5 of the low-refractive index layer 23d is also formed as a hole, the refractive index $n_{5f}$ of the low refractive index portion 5f of the low-refractive index layer 13f and the refractive index $n_5$ of the low refractive index portion 5 of the low-refractive index layer 23d of the core element 20d are the same and are 1. Although the number of low refractive index portions 5f of the low-refractive index layer 13f is the same as the number of low refractive index portions 5 of the low-refractive index layer 23d of the core element 20d, the area (the cross-sectional area vertical to the longitudinal direction) of each of the low refractive index portions 5f of the low-refractive index layer 13f is smaller than the area (the cross-sectional area vertical to the longitudinal direction) of each of the low refractive index portions 5 of the low-refractive index layer 23d. Moreover, the regions of the low-refractive index layer 13f other than the low refractive index portion 5f are formed of the same material as the cladding 40 and the inner cladding layer 12.

Thus, in the multicore fiber 103, the average refractive index $n_{3f}$ of the low-refractive index layer 13f of the core element 10f is higher than the average refractive index $n_{3d}$ of the low-refractive index layer 23d of the core element 20d, and the thickness $t_{3f}$ of the low-refractive index layer 13f of the core element 10f is smaller than the thickness $t_{3d}$ of the low-refractive index layer 23d of the core element 20d. In this manner, the low-refractive index layer 13f of the specific core element 10f has larger light confinement loss in the core 11 than the low-refractive index layers 23d of the respective core element 20d.

Here, when the respective core elements 10f and 20d are classified according to the cross-sectional structure of the core element and the average refractive index of the low-refractive index layer, the core elements 10f and 20d can be classified into the partial core element 10f and the other partial core elements 20d.

As described above, although there are no boundaries between the regions of the low-refractive index layer 13f other than the low refractive index portion 5f, and the inner cladding layer 12 and the cladding 40, the boundaries are depicted by imaginary lines in FIG. 4A for better understanding.

Such a multicore fiber 103 may use the specific core element glass member that becomes the core 11, the inner cladding layer 12, and the low-refractive index layer 13f instead of the specific core element glass member that becomes the core 11, the inner cladding layer 12, and the low-refractive index layer 13e used in manufacturing of the multicore fiber 102.

In the present embodiment, although, since the low refractive index portions 5 and 5f are formed as a hole similarly to the third embodiment, the refractive index of the low refractive index portions 5 and 5f can be further decreased, the low refractive index portions 5 and 5f are not particular limited to a hole as long as the material of the low refractive index portions 5 and 5f has a lower refractive index than the inner cladding layer 12 and the cladding 40. For example, the low refractive index portions 5 and 5f can be formed of quartz in which impurities such as fluorine that decreases the refractive index are added. In this case, according to the multicore fiber 103 of the present embodiment, since the amount of quartz in which fluorine used for the low refractive index 5f is added can be decreased, it is possible to manufacture the multicore fiber 103 at a low cost.

Fifth Embodiment

Next, a fifth embodiment of the present invention will be described with reference to FIGS. 5A and 5B. The same or equivalent constituent elements as those of the third embodiment will be denoted by the same reference numerals unless otherwise particularly stated, and redundant description thereof will not be provided.

Figure 5A:
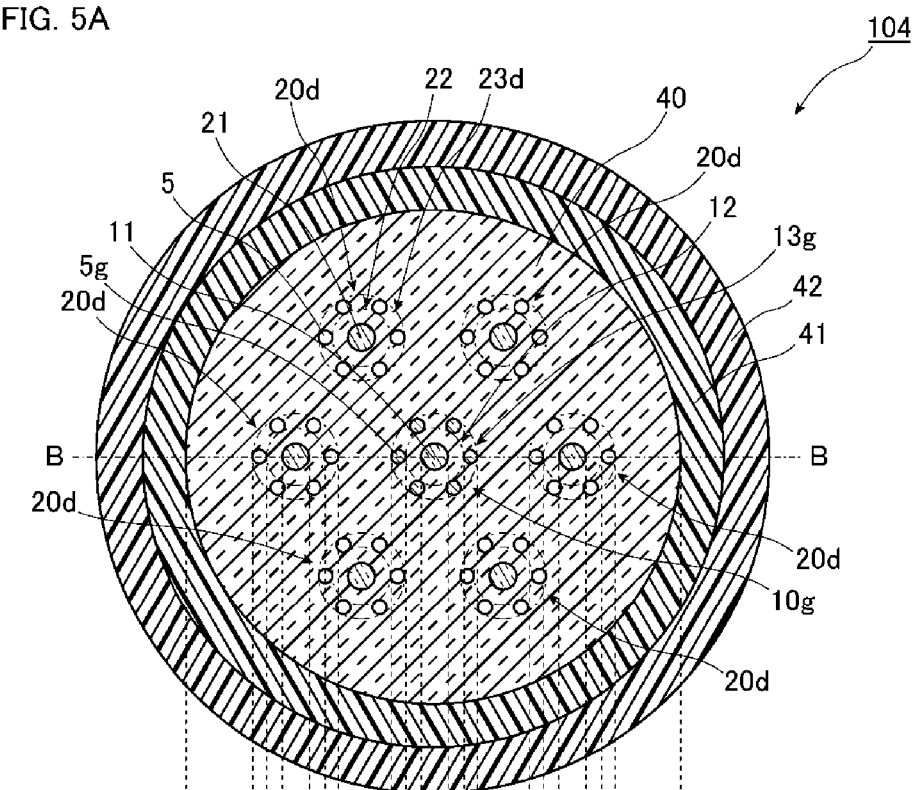
FIGS. 5A and 5B are a diagram illustrating a configuration of a multicore fiber according to a fifth embodiment of the present invention.
Figure 5B:
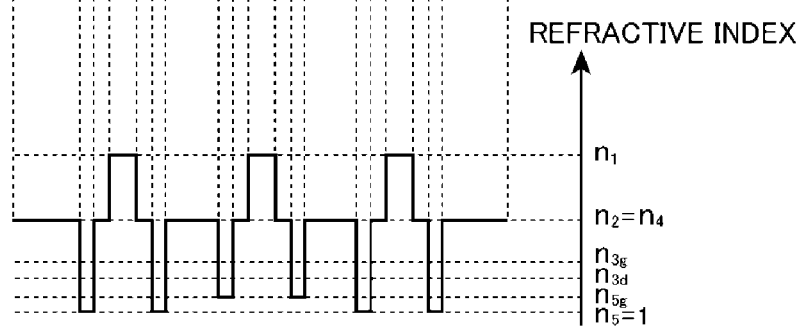

FIGS. 5A and 5B are a diagram illustrating a configuration of a multicore fiber 104 according to the fifth embodiment of the present invention. Specifically, FIG. 5A is a diagram illustrating a cross-sectional structure vertical to a longitudinal direction of the multicore fiber 104, and FIG. 5B is a diagram illustrating a refractive index distribution along a line B-B of the multicore fiber 104 illustrated in FIG. 5A.

As illustrated in FIGS. 5A and 5B, the multicore fiber 104 according to the present embodiment is different from the multicore fiber 102 according to the third embodiment, in that the multicore fiber 104 includes a specific core element 10g that is disposed at the same position as the core element 10e instead of the specific core element 10e according to the second embodiment.

The core element 10g includes the same core 11 as the core 11 of the third embodiment and the same inner cladding layer 12 as the inner cladding layer 12 of the third embodiment, surrounding the circumferential surface of the core 11. Moreover, the core element 10g includes a low-refractive index layer 13g which surrounds the circumferential surface of the inner cladding layer 12 and of which the circumferential surface is surrounded by the cladding 40.

The low-refractive index layer 13g includes a plurality of low refractive index portions 5g. The respective low refractive index portions 5g are not holes but are formed of a material such as glass that has a lower refractive index $n_{5g}$ than the refractive index $n_4$ of the cladding 40 and the refractive index $n_2$ of the inner cladding layer 12. Examples of the material of the low refractive index portion 5g having such a refractive index $n_{5g}$ include the same material as the material of the low-refractive index layers 13b and 23a of the first embodiment. Moreover, the number of low refractive index portions 5g of the low-refractive index layer 13g is the same as the number of low refractive index portions 5 of the low-refractive index layer 23d of the core element 20d, and the area (the cross-sectional area vertical to the longitudinal direction) of each of the low refractive index portions 5g is the same as the area (the cross-sectional area vertical to the longitudinal direction) of each of the low refractive index portions 5 of the low-refractive index layer 23d. Moreover, the regions of the low-refractive index layer 13g other than the low refractive index portion 5g are formed of the same material as the cladding 40 and the inner cladding layer 12.

Thus, in the multicore fiber 104, the average refractive index $n_{3g}$ of the low-refractive index layer 13g of the core element 10g is higher than the average refractive index $n_{3d}$ of the low-refractive index layer 23d of the core element 20d. In this manner, the low-refractive index layer 13g of the specific core element 10g has larger light confinement loss in the core 11 than the low-refractive index layer 23d of the core element 20d.

Here, when the respective core elements 10g and 20d are classified according to the cross-sectional structure of the core element and the average refractive index of the low-refractive index layer, the core elements 10g and 20d can be classified into the partial core element 10g and the other partial core elements 20d.

In the present embodiment, as described above, although there are no boundaries between the regions of the low-refractive index layer 13g other than the low refractive index portion 5g, and the inner cladding layer 12 and the cladding 40, the boundaries are depicted by imaginary lines in FIG. 5A for better understanding.

Such a multicore fiber 104 may use the specific core element glass member that becomes the core 11, the inner cladding layer 12, and the low-refractive index layer 13g instead of the specific core element glass member that becomes the core 11, the inner cladding layer 12, and the low-refractive index layer 13e used in manufacturing of the multicore fiber 102. The member that becomes the low-refractive index layer 13g may be a glass rod having a low refractive index that is disposed at the position corresponding to the low refractive index portion 5g.

According to the multicore fiber 104 of the present embodiment, just by changing the material of the low refractive index portion 5g of the specific core element 10g with the material of the low refractive index portion 5 of the core element 20d that surrounds the core element 10g, the respective core elements 10g and 20d can have the same size. Thus, the degree of freedom in design is improved.

In the present embodiment, although, since the low refractive index portion 5 is formed as a hole similarly to the third embodiment, the refractive index of the low refractive index portion 5 can be further decreased, the low refractive index portion 5 is not particular limited to a hole as long as the material of the low refractive index portion 5 has a lower refractive index than the inner cladding layer 12, the cladding 40, and the low refractive index portion 5g.

Sixth Embodiment

Next, a sixth embodiment of the present invention will be described with reference to FIGS. 6A and 6B. The same or equivalent constituent elements as those of the first embodiment will be denoted by the same reference numerals unless otherwise particularly stated, and redundant description thereof will not be provided.

Figure 6A:
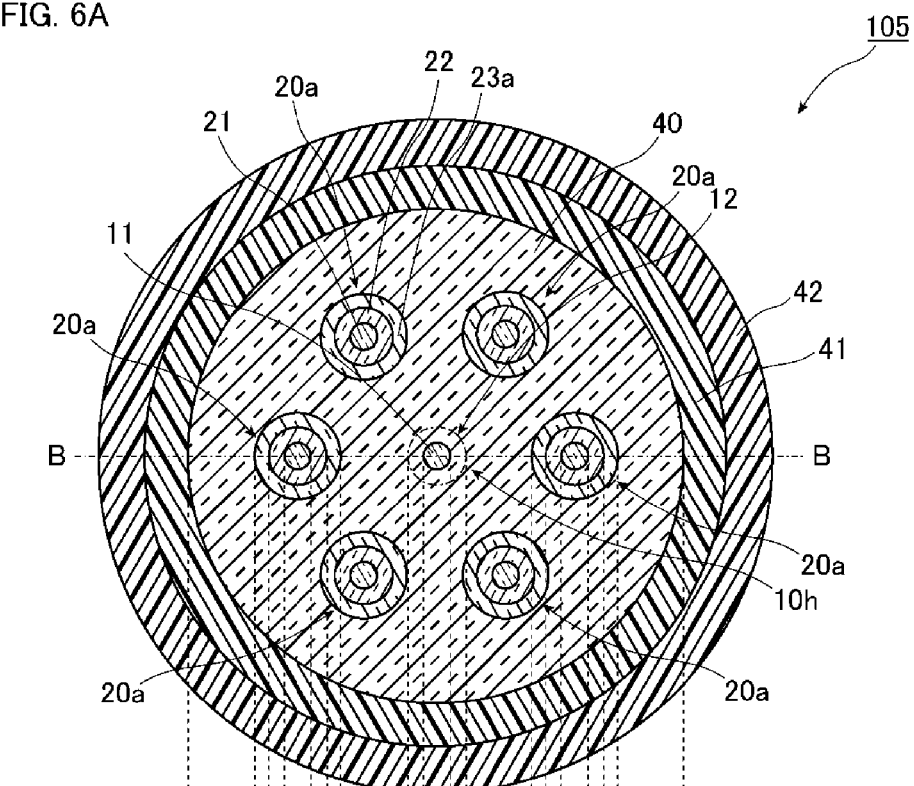
FIGS. 6A and 6B are a diagram illustrating a configuration of a multicore fiber according to a sixth embodiment of the present invention.
Figure 6B:
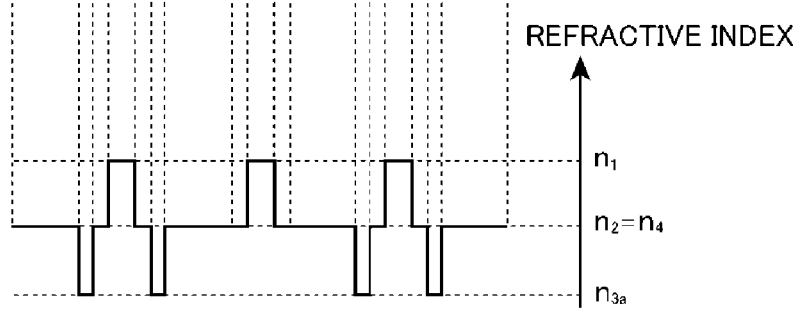

FIGS. 6A and 6B are a diagram illustrating a configuration of a multicore fiber 105 according to the sixth embodiment of the present invention. Specifically, FIG. 6A is a diagram illustrating a cross-sectional structure vertical to a longitudinal direction of the multicore fiber 105, and FIG. 6B is a diagram illustrating a refractive index distribution along a line B-B of the multicore fiber 105 illustrated in FIG. 6A.

As illustrated in FIG. 6A, the multicore fiber 105 according to the present embodiment is different from the multicore fiber 100 according to the first embodiment, in that the multicore fiber 105 includes a specific core element 10h that is disposed at the same position as the core element 10b instead of the specific core element 10b according to the first embodiment.

The core element 10h includes the same core 11 as the core 11 of the first embodiment and the same inner cladding layer 12 as the inner cladding layer 12 of the first embodiment, surrounding the circumferential surface of the core 11 but does not include the low-refractive index layer of the core element 10b. Thus, the specific core element 10h does not have the light confining effect of the low-refractive index layer, and light is confined in the core 11 by the light confining effect of the core 11.

In the multicore fiber 105 of the present embodiment, since the inner cladding layer 12 and the cladding 40 are formed of the same material, although there is no boundary between the inner cladding layer 12 and the cladding 40, an imaginary line that indicates the inner cladding layer 12 is depicted in FIG. 6A for better understanding. Thus, as in the multicore fiber 105 of the present embodiment, when the inner cladding layer 12 and the cladding 40 are formed of the same material, it can be considered that the core element 10h does not include the inner cladding layer 12 and the core 11 is directly disposed in the cladding 40. Moreover, in the multicore fiber 100 of the first embodiment, the refractive index of the low-refractive index layer 13b of the specific core element 10b which is the partial core element is increased up to the same refractive index as the cladding 40, whereby the specific core element 10b does not include the low-refractive index layer 13b, which is the same configuration as the core element 10h of the multicore fiber 105 according to the present embodiment. Thus, the multicore fiber 105 of the present embodiment has the same technical features as the multicore fiber 100 according to the first embodiment.

Here, when the respective core elements 10h and 20a are classified according to the cross-sectional structure of the core element, the core elements 10h and 20a can be classified into the partial core element 10h and the other partial core elements 20a.

Such a multicore fiber 105 includes the cladding 40 and the plurality of core elements 10h and 20a provided in the cladding 40. The plurality of core elements 10h and 20a are disposed so that the specific core element 10h is surrounded by three or more core elements 20a. The plurality of core elements 10h and 20a include the partial core element and the other partial core elements. The other partial core elements include the core 21, the inner cladding layer 22 that surrounds the core 21, and the low-refractive index layer 23a that surrounds the inner cladding layer 22 and has a lower average refractive index than the cladding 40 and the inner cladding layer 22. The partial core element includes the core 11 and does not include the low-refractive index layer, the partial core element is the specific core element 10h, and the other partial core elements are the three or more core elements 20a that surround the specific core element 10h.

Such a multicore fiber 105 may use the specific core element glass member that becomes the core 11 and the inner cladding layer 12 instead of the specific core element glass member that becomes the core 11, the inner cladding layer 12, and the low-refractive index layer 13b used in manufacturing of the multicore fiber 100. However, in the present embodiment, since the inner cladding layer 12 and the cladding 40 have the same refractive index, the inner cladding layer 12 and the cladding 40 can be formed of the same material. Thus, the portion that becomes the core element 10h may be the glass rod that becomes the core 11 and is inserted in a glass member that becomes the cladding.

According to the multicore fiber 105 of the present embodiment, since the cladding 40 and the low-refractive index layer 23a of the core element 20a are present between the core 11 of the specific core element 10h and the core 21 of each of the core elements 20a that surround the specific core element 10h, it is possible to reduce crosstalk. Moreover, since the specific core element 10h does not have the effect of confining light in the core due to the low-refractive index layer, the light in high-order modes can easily escape. In the core element 10h, it is possible to take a balance between the easiness of the light in high-order modes to escape due to the absence of the low-refractive index layer and the difficulty of the light in high-order modes to escape due to the low-refractive index layer 23a of each of the core elements 20a that surround the specific core element 10h. Thus, it is possible to prevent the cutoff wavelength of the specific core element 10h from increasing.

Since the specific core element 10h does not have a low-refractive index layer and has a simple configuration, it is possible to provide the specific core element 10h easily.

Seventh Embodiment

Next, a seventh embodiment of the present invention will be described with reference to FIGS. 7A and 7B. The same or equivalent constituent elements as those of the third embodiment will be denoted by the same reference numerals unless otherwise particularly stated, and redundant description thereof will not be provided.

Figure 7A:
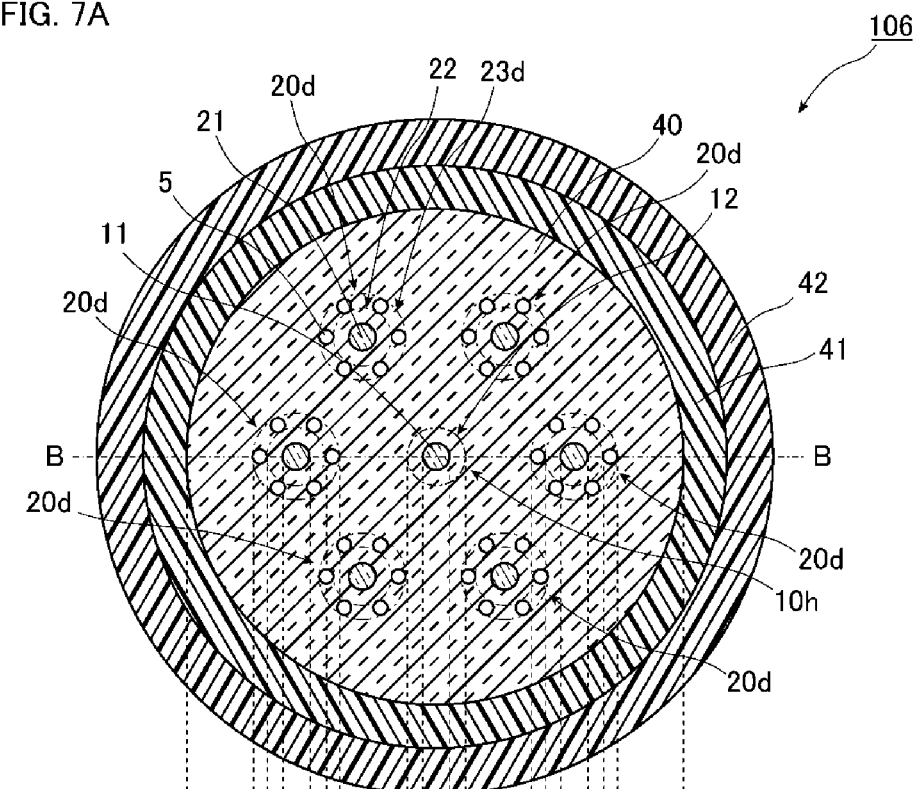
FIGS. 7A and 7B are a diagram illustrating a configuration of a multicore fiber according to a seventh embodiment of the present invention.
Figure 7B:
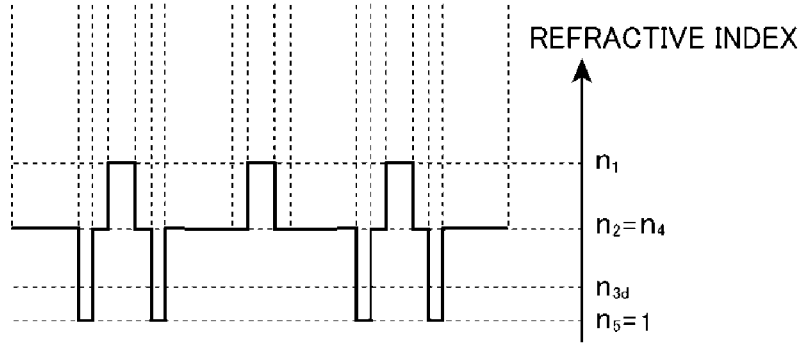

FIGS. 7A and 7B are a diagram illustrating a configuration of a multicore fiber 106 according to the seventh embodiment of the present invention. Specifically, FIG. 7A is a diagram illustrating a cross-sectional structure vertical to a longitudinal direction of the multicore fiber 106, and FIG. 7B is a diagram illustrating a refractive index distribution along a line B-B of the multicore fiber 106 illustrated in FIG. 7A.

As illustrated in FIG. 7A, the multicore fiber 106 according to the present embodiment is different from the multicore fiber 102 according to the third embodiment, in that the multicore fiber 106 includes the specific core element 10h according to the sixth embodiment instead of the specific core element 10e according to the third embodiment.

Here, when the respective core elements 10h and 20d are classified according to the cross-sectional structure of the core element and the average refractive index of the low-refractive index layer, the core elements 10h and 20d can be classified into the partial core element 10h and the other partial core elements 20d.

In the present embodiment, similarly to the third embodiment, at least one of the plurality of low refractive index portions 5 of the respective core elements 20d is disposed on a straight line that connects the core 21 of the own core element 20d and the cores 11 and 21 of the other core elements. That is, one low refractive index portion 5 of the plurality of low refractive index portions 5 in the respective core elements 20d is disposed on a straight line that connects the core 21 of the own core element 20d and the core 11 of the core element 10h, and at least another low refractive index portion 5 among the plurality of low refractive index portions 5 is disposed on a straight line that connects the core 21 of the own core element 20d and the core 21 of the other core element 20d. In this manner, since the low refractive index portion 5 is interposed between the own core 21 and the other cores 11 and 21, it is possible to further suppress the inter-core crosstalk.

Such a multicore fiber 106 may use the specific core element glass member that becomes the core 11 and the inner cladding layer 12 according to the sixth embodiment instead of the specific core element glass member that becomes the core 11, the inner cladding layer 12, and the low-refractive index layer 13e used in manufacturing of the multicore fiber 102.

In the multicore fiber 106 according to the present embodiment, similarly to the multicore fiber 105 according to the sixth embodiment, since the cladding 40 and the low-refractive index layer 23d of the core element 20d are present between the core 11 of the specific core element 10h and the cores 11 of the respective core elements 20d that surround the specific core element 10h, it is possible to reduce the crosstalk. Moreover, since the specific core element 10h does not have the effect of confining light in the core due to low-refractive index layer, the light in high-order modes can easily escape. In the core element 10h, it is possible to take a balance between the easiness of the light in high-order modes to escape due to the absence of the low-refractive index layer and the difficulty of the light in high-order modes to escape due to the low-refractive index layer 23d of each of the core elements 20d that surround the specific core element 10h. Thus, it is possible to prevent the cutoff wavelength of the specific core element 10h from increasing.

Eighth Embodiment

Next, an eighth embodiment of the present invention will be described with reference to FIG. 8. The same or equivalent constituent elements as those of the first embodiment will be denoted by the same reference numerals unless otherwise particularly stated, and redundant description thereof will not be provided.

Figure 8:
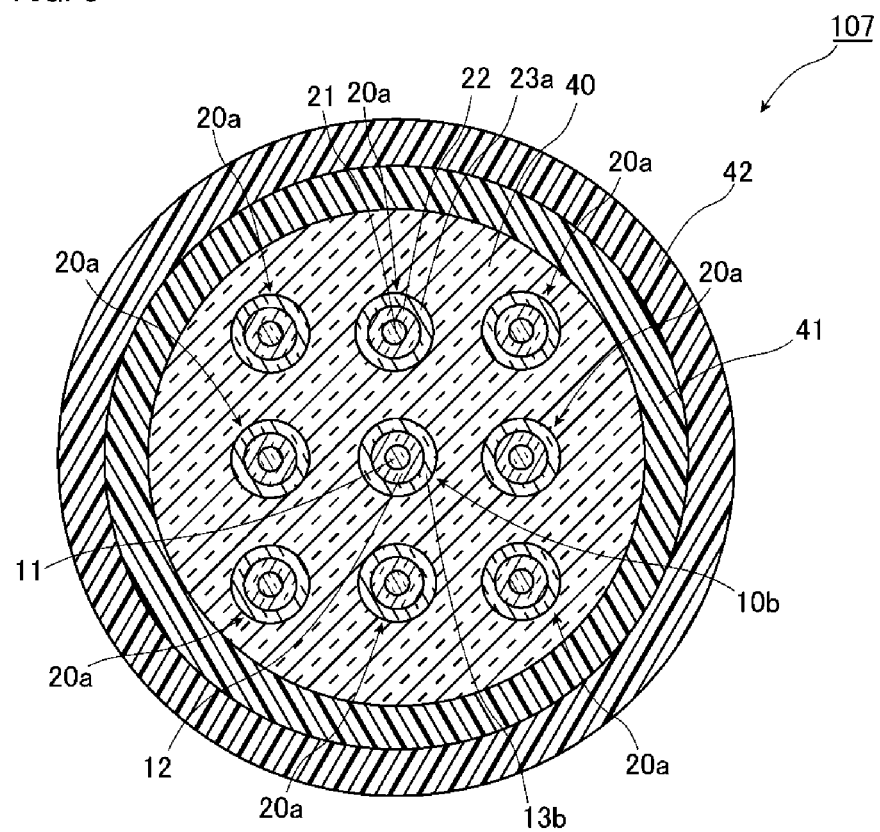
FIG. 8 is a diagram illustrating a cross-sectional structure vertical to a longitudinal direction of a multicore fiber according to an eighth embodiment of the present invention.

FIG. 8 is a diagram illustrating a cross-sectional structure vertical to a longitudinal direction of a multicore fiber 107 according to the eighth embodiment of the present invention.

As illustrated in FIG. 8, the multicore fiber 107 according to the present embodiment is different from the multicore fiber 100 according to the first embodiment, in that the number of three or more core elements 20a of the first embodiment is four or more, and the four or more core elements 20a are disposed so that the centers thereof form a rectangle.

In such a multicore fiber 107, the arrangement of the plurality of core element glass members that become the core 21, the inner cladding layer 22, and the low-refractive index layer 23a used in manufacturing of the multicore fiber 100 may be the same as the arrangement of the respective core elements 20a of the multicore fiber 107 illustrated in FIG. 8.

According to the multicore fiber 107 of the present embodiment, since the cores are disposed in a rectangular form, it is possible to easily take a matching with an optical device such as a planar waveguide and to easily input and output light to and from such an optical device.

Ninth Embodiment

Next, a ninth embodiment of the present invention will be described with reference to FIGS. 9A and 9B. The same or equivalent constituent elements as those of the first embodiment will be denoted by the same reference numerals unless otherwise particularly stated, and redundant description thereof will not be provided.

Figure 9A:
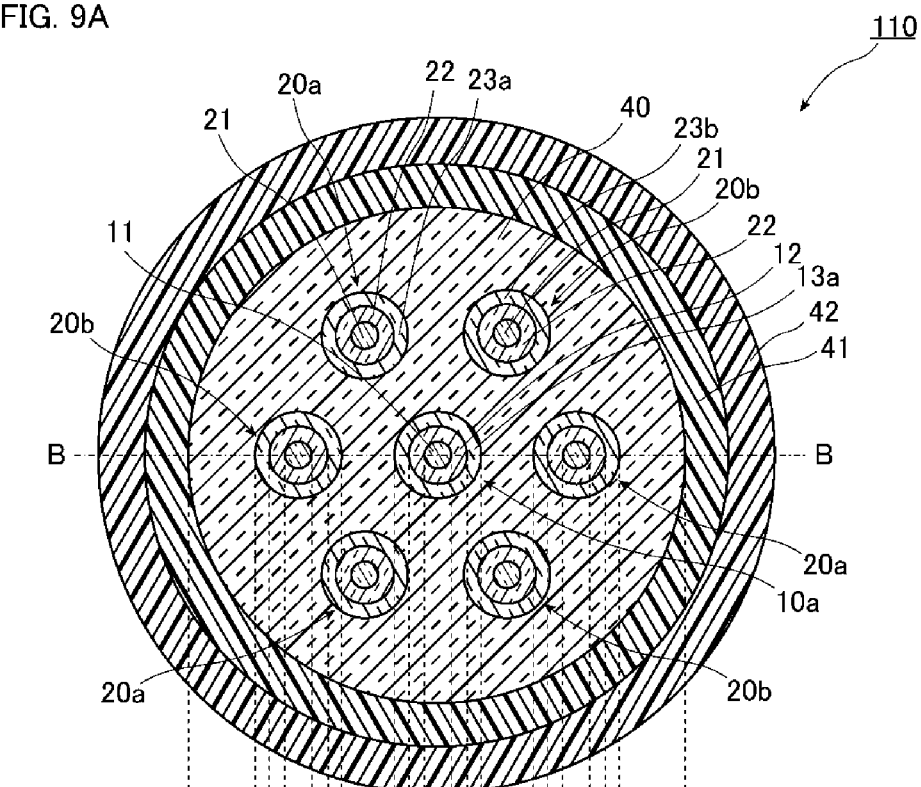
FIGS. 9A and 9B are a diagram illustrating a configuration of a multicore fiber according to a ninth embodiment of the present invention.
Figure 9B:
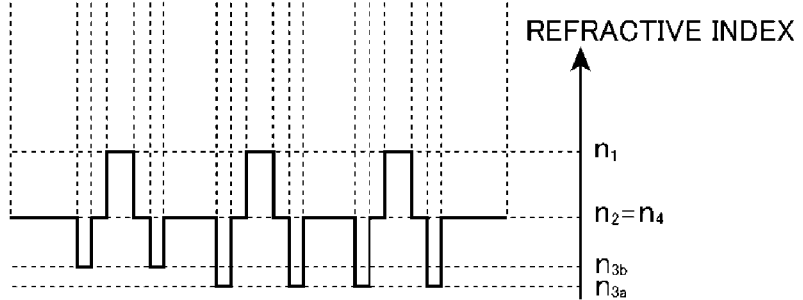

FIGS. 9A and 9B are a diagram illustrating a configuration of a multicore fiber 110 according to the ninth embodiment of the present invention. Specifically, FIG. 9A is a diagram illustrating a cross-sectional structure vertical to a longitudinal direction of the multicore fiber 110, and FIG. 9B is a diagram illustrating a refractive index distribution along a line B-B of the multicore fiber 110 illustrated in FIG. 9A.

As illustrated in FIG. 9A, the multicore fiber 100 according to the present embodiment is different from the multicore fiber 100 according to the first embodiment, in that a plurality of core elements 10a, 20a, and 20b is disposed in the cladding.

The specific core element 10a is disposed at the center of the cladding 40, and the three or more core elements that include the core element 20a and the core element 20b are disposed so as to surround the specific core element 10a. The number of three or more core elements that include the core elements 20a and 20b is an even number, the core elements 20a and the core elements 20b are alternately arranged, and the core elements 20a and the core elements 20b are arranged at equal intervals, respectively. FIG. 9A illustrates a case where one core element 10a is surrounded by six core elements that include the core elements 20a and 20b.

The core element 10a includes the same core 11 as the core 11 of the core element 10b of the first embodiment, the same inner cladding layer 12 as the inner cladding layer 12 of the first embodiment, surrounding the circumferential surface of the core 11, and the low-refractive index layer 13a that surrounds the circumferential surface of the inner cladding layer 12. As illustrated in FIG. 9B, the low-refractive index layer 13a is different from the low-refractive index layer 13b of the first embodiment, in that the refractive index $n_{3a}$ of the low-refractive index layer 13a is lower than the refractive index $n_{3b}$ of the low-refractive index layer 13b of the core element 10b of the first embodiment and is the same as the low-refractive index layer 23a of the core element 20a. The other configuration thereof is the same as that of the low-refractive index layer 13b of the first embodiment.

The core element 20b includes the same core 21 as the core 21 of the core element 20a, the same inner cladding layer 22 as the inner cladding layer 22 of the core element 20a, surrounding the circumferential surface of the core 21, and the low-refractive index layer 23b that surrounds the circumferential surface of the inner cladding layer 22. As illustrated in FIG. 9B, the low-refractive index layer 23b is different from the low-refractive index layer 23a of the core element 20a, in that the refractive index $n_{3b}$ of the low-refractive index layer 23b is higher than the refractive index $n_{3a}$ of the low-refractive index layer 23a of the core element 20a. The other configuration thereof is the same as that of the low-refractive index layer 23a of the core element 20a.

In this manner, the low-refractive index layer 23b of the core element 20b has larger light confinement loss in the core 21 than the low-refractive index layers 13a and 23a of the core elements 10a and 20a.

In the present embodiment, the refractive index $n_{3a}$ of the low-refractive index layer 13a of the core element 10a is the same as the refractive index of the low-refractive index layer 23a of the core element 20a. That is, although the core element 10a and the respective core elements 20a have the same structure, size, and refractive index, the core element 20b of the plurality of core elements has the same structure and size as (but a different refractive index from) the core elements 10a and 20a. Here, when the respective core elements 10a, 20a, and 20b are classified according to the refractive index, the plurality of core elements 10a, 20a, and 20b can be classified into the partial core element 20b and the other partial core elements 10a and 20a.

In such a multicore fiber 110, when the respective core elements 10a, 20a, and 20b are seen from the perspective of the refractive index, since the low-refractive index layers 13a, 23a, and 23b of the core elements 10a, 20a, and 20b have a rectangular shape, and the respective core elements 10a, 20a, and 20b have a trench structure, the effect of confining light in the core 11 increases, and light becomes difficult to leak from the core 11. Further, since the low-refractive index layers 13a, 23a, and 23b, and the cladding 40 having the low refractive index become barriers, it is possible to suppress the crosstalk between the cores 11 and 21 of the core elements 10a, 20a, and 20b. Moreover, the bending loss of the multicore fiber 110 decreases. Further, since a mass production method for the optical fiber having the trench structure is well established, it is possible to easily manufacture the multicore fiber 110 at a low cost. In the present embodiment, since the refractive indices of the respective low-refractive index layers 13a, 23a, and 23b are uniform in the low-refractive index layers 13a, 23a, and 23b, the refractive indices $n_{3a}$ and $n_{3b}$ of the low-refractive index layers 13a, 23a, and 23b have the same meaning as the average refractive index.

As described above, the low-refractive index layer 13a of the core element 10a and the low-refractive index layer 23a of each of the core elements 20a have the same refractive index $n_{3a}$, and the refractive index $n_{3b}$ of the low-refractive index layer 23b of the core element 20b is higher than the refractive index $n_{3a}$ of the low-refractive index layers 13a and 23a of the core elements 10a and 20a and satisfies a relation of $n_{3a}<n_{3b}$. Thus, the low-refractive index layer 23b of the partial core element 20b classified in the above described manner has larger light confinement loss in the core 11 than the low-refractive index layers 13a and 23a of the other partial core elements 10a and 20a. That is, in the partial core element 20b, the effect of the low-refractive index layer confining light in the own core is weaker than the other partial core elements 10a and 20a, and light can easily escape from the core element 20b. Thus, the light confinement loss increases in the inside (a region including the regions between the core element 10a and the core elements 20a and 20b) of the entire core elements 20a and 20b that surround the specific core element 10a, and the light in high-order modes can easily escape from the vicinity of the partial core element 20b.

Such a multicore fiber 110 is manufactured in the following manner. First, a specific core element glass member that becomes the core 11, the inner cladding layer 12, and the low-refractive index layer 13a, a plurality of core element glass members that becomes the core 21, the inner cladding layer 22, and the low-refractive index layer 23a, and a plurality of core element glass members that becomes the core 21, the inner cladding layer 22, and the low-refractive index layer 23b are prepared. Further, such a core element glass member is disposed in a cladding glass member that becomes the cladding 40 or a portion of the cladding 40 and is allowed to collapse, whereby a fiber base member of which the cross-sectional arrangement is similar to that of the multicore fiber 110 illustrated in FIG. 9A excluding the inner protective layer 41 and the outer protective layer 42 is manufactured. The manufactured fiber base member is heated, melted, and spun into a multicore fiber, and the multicore fiber is covered with the inner protective layer 41 and the outer protective layer 42 to obtain the multicore fiber 110. The core element glass member may be disposed in the cladding glass member that becomes the cladding 40 or a portion of the cladding 40 and spinning may be performed while allowing the glass members to collapse.

As described above, according to the multicore fiber 110 of the present embodiment, in the vicinity of the partial core element 20b as described above, the light in high-order modes in the specific core element 10a can escape from the vicinity of the partial core element 20b. Thus, it is possible to suppress the cutoff wavelength of the specific core element 10a from increasing. In this manner, it is possible to suppress the cutoff wavelengths of the respective core elements 10a, 20a, and 20b from becoming different and to suppress the conditions for performing single-mode communication from becoming different in the respective core elements 10a, 20a, and 20b.

In the multicore fiber 110 of the present embodiment, the partial core element 20b and the other partial core elements 20a are alternately arranged as described above. Thus, locations where light can easily escape in regions surrounding the specific core element 10a can be arranged so as to be symmetrical about the specific core element 10a. Thus, the light in the specific core element 10a can be suppressed from being unevenly distributed in the radial direction of the core 11.

In the present embodiment, although the partial core element 20b and the other partial core elements 20a are arranged alternately as described above, the partial core elements 20b may be arranged alternately.

In the multicore fiber 110 of the present embodiment, as described above, since the refractive index $n_{3b}$ of the low-refractive index layer 23b of the partial core element 20b is lower than the refractive index $n_{3a}$ of the partial core elements 10a and 20a, the low-refractive index layer 13b of the partial core element 20b has larger light confinement loss in the core 21 than the low-refractive index layer 13a and 23a of the other partial core elements 10a and 20a. Thus, just by changing the material of the low-refractive index layer 23b of the partial core element 20b with the material of the low-refractive index layers 13a and 23a of the other partial core elements 10a and 20a, the respective core elements 10a, 20a, and 20b can have the same size. Therefore, the degree of freedom in design is improved.

Tenth Embodiment

Next, a tenth embodiment of the present invention will be described in detail with reference to FIGS. 10A and 10B. The same or equivalent constituent elements as those of the ninth embodiment will be denoted by the same reference numerals unless otherwise particularly stated, and redundant description thereof will not be provided.

Figure 10A:
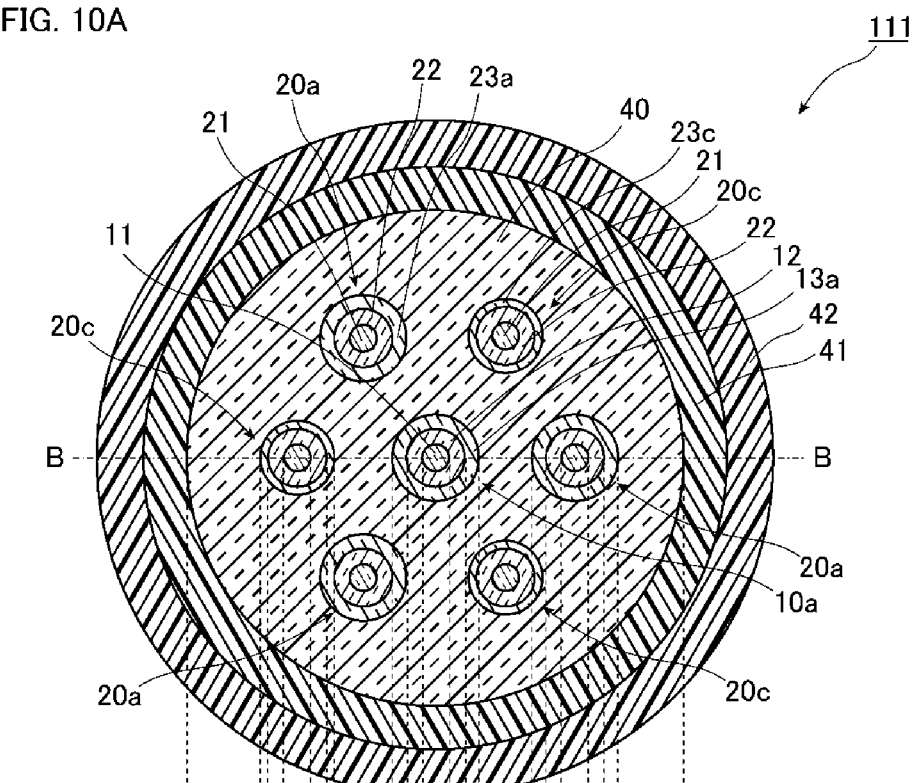
FIGS. 10A and 10B are a diagram illustrating a configuration of a multicore fiber according to a tenth embodiment of the present invention.
Figure 10B:
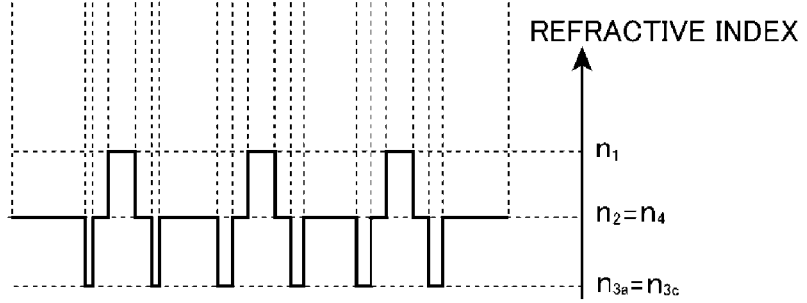

FIGS. 10A and 10B are a diagram illustrating a configuration of a multicore fiber 111 according to the tenth embodiment of the present invention. Specifically, FIG. 10A is a diagram illustrating a cross-sectional structure vertical to a longitudinal direction of the multicore fiber 111, and FIG. 10B is a diagram illustrating a refractive index distribution taken along a line B-B of the multicore fiber 111 illustrated in FIG. 10A.

As illustrated in FIG. 10A, the multicore fiber 111 according to the present embodiment is different from the multicore fiber 110 according to the ninth embodiment, in that the multicore fiber 111 includes a core element 20c that is disposed at the same position as the core element 20b instead of the partial core element 20b of the ninth embodiment.

The core element 20c includes the same core 21 as the core 21 of the ninth embodiment, the same inner cladding layer 22 as the inner cladding layer 22 of the ninth embodiment, surrounding the circumferential surface of the core 21, and a low-refractive index layer 23c that surrounds the circumferential surface of the inner cladding layer 22. As illustrated in FIG. 10B, the refractive index $n_{3c}$ of the low-refractive index layer 23c is the same as the refractive index $n_{3a}$ of the respective low-refractive index layers 13a and 23a of the specific core element 10a or the core elements 20a that surround the specific core element 10a. Further, the thickness $t_{3c}$ of the low-refractive index layer 23c is smaller than the thickness $t_{3a}$ of the low-refractive index layers 13a and 23a. The low-refractive index layer 23c of the core element 20c has larger light confinement loss in the core 21 than the low-refractive index layers 13a and 23a of the core elements 10a and 20a.

In the present embodiment, the outer diameter of the core element 20c is smaller than the outer diameter of the core elements 10a and 20a by an amount corresponding to the thickness $t_{3a}$ of the low-refractive index layers 13a and 23a and the thickness $t_{3c}$ of the low-refractive index layer 23c.

Such a multicore fiber 111 may use the core element glass member that becomes the core 21, the inner cladding layer 22, and the low-refractive index layer 23c instead of the core element glass member that becomes the core 21, the inner cladding layer 22, and the low-refractive index layer 23b used in manufacturing of the multicore fiber 110.

According to the multicore fiber 111 of the present embodiment, as described above, since the low-refractive index layer 23c of the partial core element 20c is thinner than the low-refractive index layers 13a and 23a of the other partial core elements 10a and 20a, the low-refractive index layer 23c of the core element 20c has larger light confinement loss than the low-refractive index layers 13a and 23a of the core elements 10a and 20a. In this case, the light confinement loss of the specific core element 10a increases near the core element 20c having large light confinement loss, and the light in high-order modes propagating from the specific core element 10a can easily escape. Thus, it is possible to suppress the cutoff wavelength of the specific core element 10a from increasing.

In the multicore fiber 111 of the present embodiment, the material of the low-refractive index layer 23c of the partial core element 20c can be formed of the same material as the low-refractive index layers 13a and 23a of the other partial core elements 10a and 20a. Thus, the degree of freedom in selecting the material of the low-refractive index layer is improved.

Eleventh Embodiment

Next, an eleventh embodiment of the present invention will be described in detail with reference to FIGS. 11A and 11B. The same or equivalent constituent elements as those of the ninth embodiment will be denoted by the same reference numerals unless otherwise particularly stated, and redundant description thereof will not be provided.

Figure 11A:
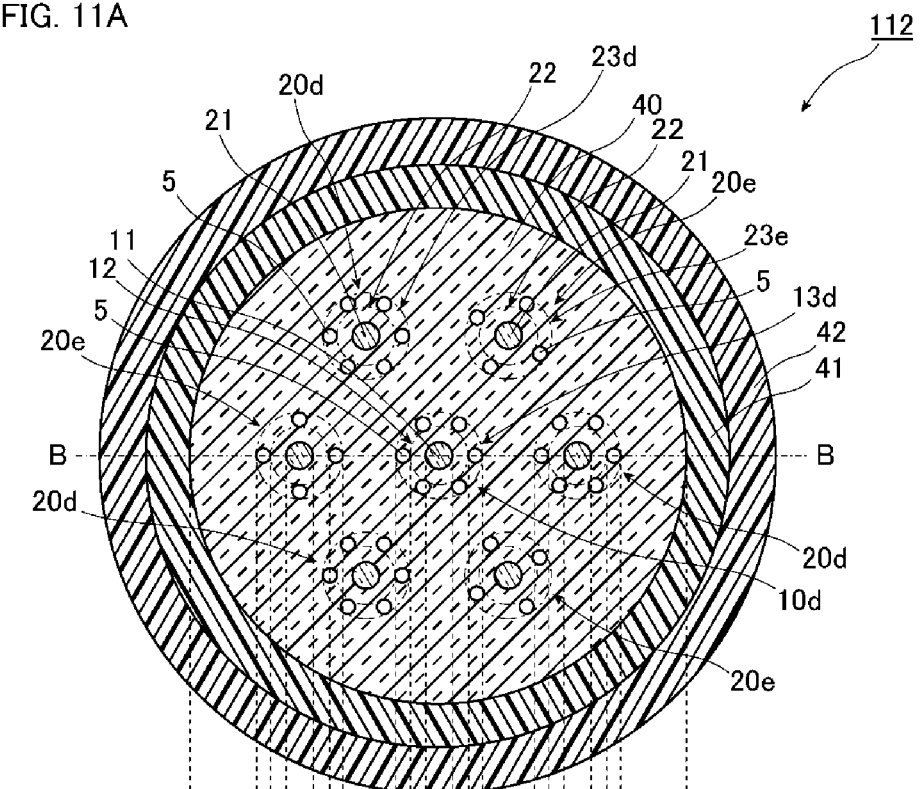
FIGS. 11A and 11B are a diagram illustrating a configuration of a multicore fiber according to an eleventh embodiment of the present invention.
Figure 11B:
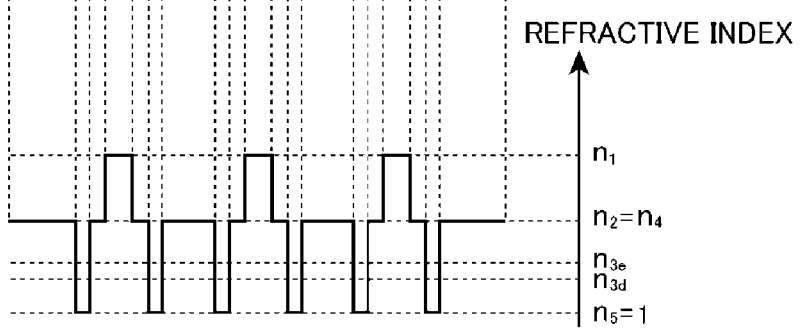

FIGS. 11A and 11B are a diagram illustrating a configuration of a multicore fiber 112 according to the eleventh embodiment of the present invention. Specifically, FIG. 11A is a diagram illustrating a cross-sectional structure vertical to a longitudinal direction of the multicore fiber 112, and FIG. 11B is a diagram illustrating a refractive index distribution along a line B-B of the multicore fiber 112 illustrated in FIG. 11A.

As illustrated in FIGS. 11A and 11B, the multicore fiber 112 according to the present embodiment is different from the multicore fiber 110 according to the ninth embodiment, in that the multicore fiber 112 includes a specific core element 10d disposed at the same position as the core element 10a instead of the specific core element 10a of the ninth embodiment, core elements 20d disposed at the same positions as the respective core elements 20a instead of the core elements 20a of the ninth embodiment, and core elements 20e disposed at the same positions as the respective core elements 20b instead of the core elements 20b of the ninth embodiment.

As illustrated in FIG. 11A, the specific core element 10d has the same structure as the respective core elements 20d. The respective core elements 10d and 20d have the same cores 11 and 21 as the cores 11 and 21 of the ninth embodiment and the same inner cladding layers 12 and 22 as the inner cladding layers 12 and 22 of the ninth embodiment, surrounding the circumferential surfaces of the cores 11 and 21. Moreover, the core elements 10d and 20d include low-refractive index layers 13d and 23d which surround the circumferential surfaces of the inner cladding layers 12 and 22 and of which the circumferential surfaces are surrounded by the cladding 40. Further, each of the core elements 20e includes the same core 21 as the core 21 of the ninth embodiment and the same inner cladding layer 22 as the inner cladding layer 22 of the ninth embodiment, surrounding the circumferential surface of the core 21. The core element 20e includes a low-refractive index layer 13e which surrounds the circumferential surface of the inner cladding layer 12 and of which the circumferential surface is surrounded by the cladding 40.

Each of the low-refractive index layers 13d, 23d, and 23e includes a plurality of low refractive index portions 5 which has a lower refractive index than the cladding 40 and the inner cladding layer 12 and surrounds the inner cladding layer 12. In the present embodiment, a plurality of circular holes is formed in the low-refractive index layers 13d, 23d, and 23e, and the holes are the low refractive index portions 5. Thus, the low refractive index portion 5 has a circular cross-sectional shape.

Since the specific core element 10d and the respective core elements 20d have the same structure as described above, the number and the size of the low refractive index portions 5 provided in the low-refractive index layer 13d are the same as the number and the size of the low refractive index portions 5 provided in the low-refractive index layer 23d. On the other hand, the number of low refractive index portions 5 provided in the low-refractive index layer 23e of the core element 20e is smaller than the number of low refractive index portions 5 provided in each of the low-refractive index layers 13d and 23d, but the low refractive index portions 5 have the same size.

As illustrated in FIG. 11A, at least one of the plurality of low refractive index portions 5 of each of the core elements 10d, 20d, and 20e is disposed on a straight line that connects the cores 11 and 21 of the own core element and the cores 11 and 21 of the other core elements. Specifically, the low refractive index portion 5 of the core element 10d is disposed on a straight line that connects the core 11 of the own core element 10d and the cores 21 of the core elements 20d and 20e. Moreover, in each core element 20d, one of the low refractive index portions 5 is disposed on a straight line that connects the core 21 of the own core element 20d and the core 11 of the core element 10d, and at least another one of the low refractive index portions 5 is disposed on a straight line that connects the core 21 of the own core element 20d and the core 21 of the other core element 20e. Further, in the core element 20e, one of the low refractive index portions 5 is disposed on a straight line that connects the core 21 of the own core element 20e and the core 11 of the core element 10d. In this manner, since the low refractive index portion 5 is interposed between the core of the own core element and the core of the other core element, it is possible to further suppress the inter-core crosstalk.

The regions of the low-refractive index layers 13d, 23d, and 23e other than the low refractive index portion 5 are formed of the same material as the cladding 40 and the inner cladding layer 12. As illustrated in FIG. 11B, since the low refractive index portion 5 is a hole, and the refractive index $n_5$ of the low refractive index portion 5 is 1 and is lower than the refractive indices $n_2$ and $n_4$ of the inner cladding layer 12 and the cladding 40, the average refractive index $n_{3d}$ of the low-refractive index layers 13d and 23d and the average refractive index $n_{3e}$ of the low-refractive index layer 23e are lower than the inner cladding layer 12 and the cladding 40.

As described above, since the number of low refractive index portions 5 of the low-refractive index layer 23e of the partial core element 20e is smaller than the number of low refractive index portions 5 of the low-refractive index layers 13d and 23d of the other partial core elements 10d and 20d, the average refractive index $n_{3e}$ of the low-refractive index layer 23e is higher than the average refractive index $n_{3d}$ of the low-refractive index layers 13d and 23d. When the respective core elements 10d, 20d, and 20e are classified according to the cross-sectional structure of the core element and the average refractive index of the low-refractive index layer, the core elements 10d, 20d, and 20e can be classified into the partial core element 20e and the other partial core elements 10d and 20d. In this manner, since the average refractive index $n_{3e}$ of the low-refractive index layer 23e is higher than the average refractive index $n_{3d}$ of the low-refractive index layers 13d and 23d, the low-refractive index layer 23e of the partial core element 20e has larger light confinement loss in the core 21 than the low-refractive index layers 13d and 23d of the other partial core elements 10d and 20d.

As described above, although there are no boundaries between the regions of the low-refractive index layers 13d, 23d, and 23e other than the low refractive index portion 5 and the inner cladding layer 12 and 22 and the cladding 40, the boundaries are depicted by imaginary lines in FIG. 11A for better understanding.

Such a multicore fiber 112 is manufactured in the following manner.

First, a specific core element glass member that becomes the core 11, the inner cladding layer 12, and the low-refractive index layer 13d, a plurality of core element glass members that becomes the core 21, the inner cladding layer 22, and the low-refractive index layer 23d, and a plurality of core element glass members that becomes the core 21, the inner cladding layer 22, and the low-refractive index layer 23e are prepared. The member that becomes the low-refractive index layers 13d, 23d, and 23e is a glass tube that is disposed at the positions corresponding to the respective low refractive index portions so that the respective low refractive index portions (holes) are formed. These core element glass members are disposed in the cladding glass member that becomes the cladding 40 or a portion of the cladding 40 and are allowed to collapse with predetermined pressure applied to the penetration holes of the glass tubes, whereby a fiber base member of which the cross-sectional arrangement is similar to that of the multicore fiber 112 illustrated in FIG. 11A excluding the inner protective layer 41 and the outer protective layer 42 is manufactured. The manufactured fiber base member is heated, melted, and spun into a multicore fiber with predetermined pressure applied to the penetration holes, and the multicore fiber is covered with the inner protective layer 41 and the outer protective layer 42 to obtain the multicore fiber 112. The core element glass member may be disposed in the cladding glass member that becomes the cladding 40 and a portion of the cladding 40 and spinning may be performed with predetermined pressure applied to the penetration holes while allowing the glass members to collapse.

According to the multicore fiber 112 of the present embodiment, since the low-refractive index layer 23e of the partial core element 20e has larger light confinement loss in the core 21 than the low-refractive index layers 13d and 23d of the other partial core elements 10d and 20d, it is possible to prevent the cutoff wavelength of the core 11 of the specific core element 10d from increasing. Moreover, since the low refractive index portion 5 having a low refractive index is not formed continuously in a circular form so as to surround the respective cores 11 and 21, the light in high-order modes can appropriately escape from the respective cores 11 and 21. Thus, it is possible to suppress the cutoff wavelengths of the respective cores 11 and 21 from increasing.

In the present embodiment, by decreasing the number of low refractive index portions 5 of the specific core element 10d, it is possible to reduce the cost of providing the low refractive index portion 5 and to provide the low-refractive index layer 13d of the specific core element 10d easily. Specifically, if the low refractive index portion 5 is a hole, when the hole is formed by drilling in manufacturing of the fiber base member, it is possible to reduce the drilling cost. When the hole portion is manufactured using a glass tube, it is possible to reduce the number of glass tubes. In either case, it is possible to manufacture the fiber at a low cost.

In the present embodiment, although, since the low refractive index portion 5 is formed as a hole, the refractive index of the low refractive index portion 5 can be further decreased, the low refractive index portion 5 is not particularly limited to a hole as long as the material of the low refractive index portion 5 has a lower refractive index than the inner cladding layer 12 and the cladding 40. For example, the low refractive index portion 5 can be formed of quartz in which impurities such as fluoride that decreases the refractive index are added. In this case, according to the multicore fiber 112 of the present embodiment, since the amount of quartz in which expensive fluoride is added can be decreased, it is possible to manufacture the multicore fiber 112 at a low cost.

Twelfth Embodiment

Next, a twelfth embodiment of the present invention will be described in detail with reference to FIGS. 12A and 12B. The same or equivalent constituent elements as those of the eleventh embodiment will be denoted by the same reference numerals unless otherwise particularly stated, and redundant description thereof will not be provided.

Figure 12A:
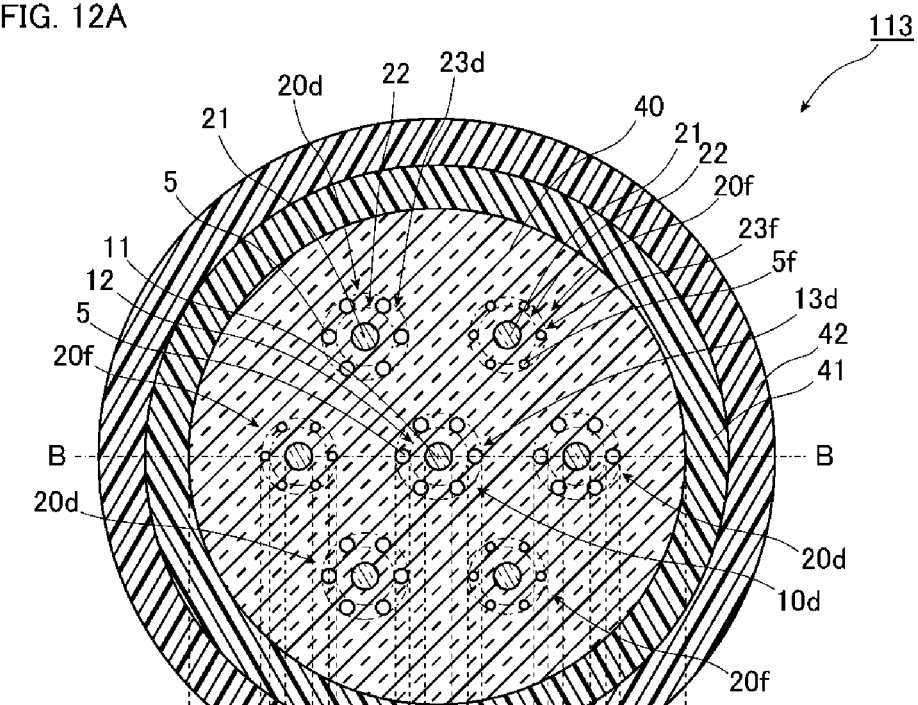
FIGS. 12A and 12B are a diagram illustrating a configuration of a multicore fiber according to a twelfth embodiment of the present invention.
Figure 12B:
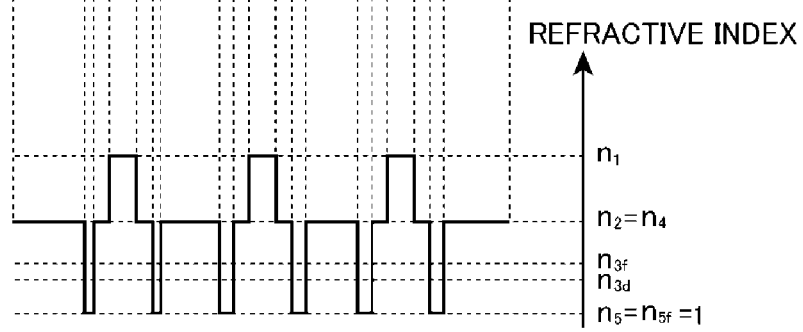

FIGS. 12A and 12B are a diagram illustrating a configuration of a multicore fiber 113 according to the twelfth embodiment of the present invention. Specifically, FIG. 12A is a diagram illustrating a cross-sectional structure vertical to a longitudinal direction of the multicore fiber 113, and FIG. 12B is a diagram illustrating a refractive index distribution taken along a line B-B of the multicore fiber 113 illustrated in FIG. 12A.

As illustrated in FIGS. 12A and 12B, the multicore fiber 113 according to the present embodiment is different from the multicore fiber 112 according to the eleventh embodiment, in that the multicore fiber 113 includes a core element 20f that is disposed at the same position as the core element 20e instead of the partial core element 20e according to the eleventh embodiment.

The core element 20f includes the same core 21 as the core 21 of the partial core element 20e of the eleventh embodiment and the same inner cladding layer 22 as the inner cladding layer of the core element 20e of the eleventh embodiment, surrounding the circumferential surface of the core 21. The core element 20f includes a low-refractive index layer 23f which surrounds the circumferential surface of the inner cladding layer 22 and of which the circumferential surface is surrounded by the cladding 40.

The low-refractive index layer 23f includes a plurality of low refractive index portions 5f which is formed as a hole having a circular cross-sectional shape. As described above, since the low refractive index portions 5 of the low-refractive index layers 13d and 23d of the core elements 10d and 20d are also formed as a hole, the refractive index $n_{5f}$ of the low refractive index portion 5f of the low-refractive index layer 23f and the refractive index $n_5$ of the low refractive index portions 5 of the low-refractive index layers 13d and 23d of the core elements 10d and 20d are the same and are 1. Although the number of low refractive index portions 5f of the low-refractive index layer 23f is the same as the number of low refractive index portions 5 of the low-refractive index layers 13d and 23d of the core elements 10d and 20d, the area (the cross-sectional area vertical to the longitudinal direction) of each of the low refractive index portions 5f of the low-refractive index layer 23f is smaller than the area (the cross-sectional area vertical to the longitudinal direction) of each of the low refractive index portions 5 of the low-refractive index layers 13d and 23d.

Moreover, the regions of the low-refractive index layer 23f other than the low refractive index portion 5f are formed of the same material as the cladding 40 and the inner cladding layer 12. Thus, as illustrated in FIG. 12B, in the multicore fiber 113, the average refractive index $n_{3f}$ of the low-refractive index layer 23f of the core element 20f is higher than the average refractive index $n_{3d}$ of the low-refractive index layers 13d and 23d of the core elements 10d and 20d, and the thickness $t_{3f}$ of the low-refractive index layer 23f of the core element 20f is smaller than the thickness $t_{3d}$ of each of the low-refractive index layers 13d and 23d of the core elements 10d and 20d.

When the respective core elements 10d, 20d, and 20f are classified according to the cross-sectional structure of the core element and the refractive index, the core elements 10d, 20d, and 20f can be classified into the partial core element 20f and the other partial core elements 10d and 20d.

Due to the structure and the refractive index described above, the low-refractive index layer 23f of the partial core element 20f has larger light confinement loss in the core 21 than the low-refractive index layers 13d and 23d of the core elements 10d and 20d.

As described above, although there are no boundaries between the regions of the low-refractive index layer 23f other than the low refractive index portion 5f and the inner cladding layer 22 and the cladding 40, the boundaries are depicted by imaginary lines in FIG. 12A for better understanding.

Such a multicore fiber 113 may use the plurality of core element glass members that becomes the core 21, the inner cladding layer 22, and the low-refractive index layer 23f instead of the plurality of core element glass members that becomes the core 21, the inner cladding layer 22, and the low-refractive index layer 23e used in manufacturing of the multicore fiber 112 according to the tenth embodiment.

In the present embodiment, although, since the low refractive index portions 5 and 5f are formed as a hole similarly to the eleventh embodiment, the refractive index of the low refractive index portions 5 and 5f can be further decreased, the low refractive index portions 5 and 5f are not particularly limited to a hole as long as the material of the low refractive index portions 5 and 5f has a lower refractive index than the inner cladding layers 12 and 22 and the cladding 40.

Thirteenth Embodiment

Next, a thirteenth embodiment of the present invention will be described in detail with reference to FIGS. 13A and 13B. The same or equivalent constituent elements as those of the eleventh embodiment will be denoted by the same reference numerals unless otherwise particularly stated, and redundant description thereof will not be provided.

Figure 13A:
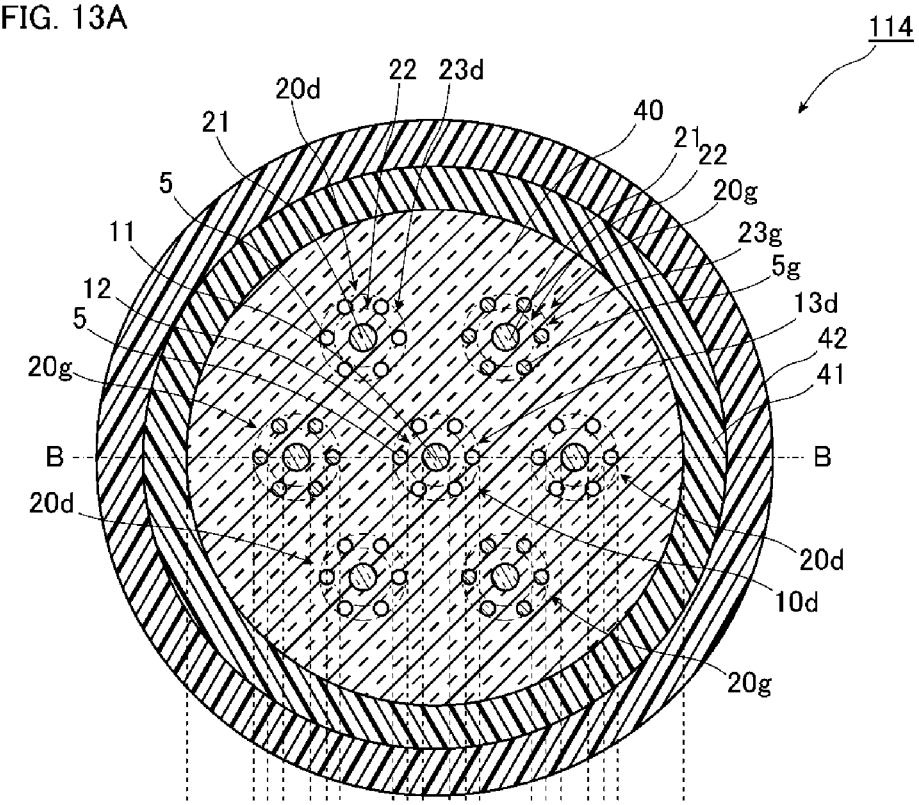
FIGS. 13A and 13B are a diagram illustrating a configuration of a multicore fiber according to a thirteenth embodiment of the present invention.
Figure 13B:
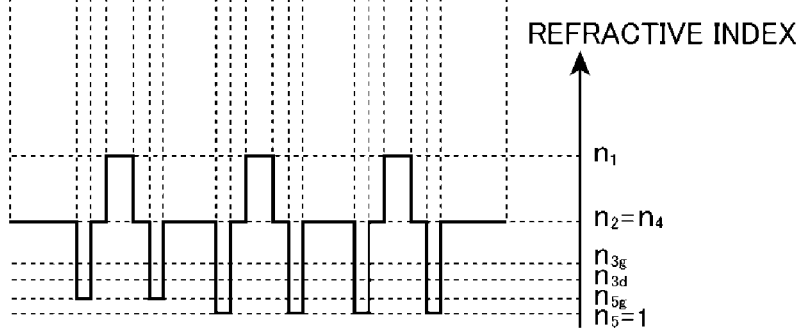

FIGS. 13A and 13B are a diagram illustrating a configuration of a multicore fiber 114 according to the thirteenth embodiment of the present invention. Specifically, FIG. 13A is a diagram illustrating a cross-sectional structure vertical to a longitudinal direction of the multicore fiber 114, and FIG. 13B is a diagram illustrating a refractive index distribution taken along a line B-B of the multicore fiber 114 illustrated in FIG. 13A.

As illustrated in FIGS. 13A and 13B, the multicore fiber 114 according to the present embodiment is different from the multicore fiber 112 according to the eleventh embodiment, in that the multicore fiber 114 includes a core element 20g that is disposed at the same position as the core element 20e instead of the partial core element 20e according to the eleventh embodiment.

The core element 20g includes the same core 21 as the core 21 of the core element 20e of the eleventh embodiment and the same inner cladding layer 22 as the inner cladding layer 22 of the eleventh embodiment, surrounding the circumferential surface of the core 21. Moreover, the core element 20g includes a low-refractive index layer 23g which surrounds the circumferential surface of the inner cladding layer 22 and of which the circumferential surface is surrounded by the cladding 40.

The low-refractive index layer 23g includes a plurality of low refractive index portions 5g. The respective low refractive index portions 5g are not holes, but are formed of a material such as glass that has a lower refractive index $n_{5g}$ than the refractive index $n_4$ of the cladding 40 and the refractive index $n_2$ of the inner cladding layer 12. Examples of the material of the low refractive index portion 5g having such a refractive index $n_{5g}$ include the same material as the material of the low-refractive index layer 13a of the ninth embodiment. Moreover, the number of low refractive index portions 5g of the low-refractive index layer 23g is the same as the number of low refractive index portions 5 of the low-refractive index layers 13d and 23d of the core elements 10d and 20d, and the area (the cross-sectional area vertical to the longitudinal direction) of each of the low refractive index portions 5g is the same as the area (the cross-sectional area vertical to the longitudinal direction) of each of the low refractive index portions 5 of the low-refractive index layers 13d and 23d. Moreover, the regions of the low-refractive index layer 23g other than the low refractive index portion 5g are formed of the same material as the cladding 40 and the inner cladding layer 12.

As described above, since the low refractive index portion 5g is formed of a material such as glass, the low refractive index portion 5g has a higher refractive index than the low refractive index portion 5 formed as a hole. Thus, in the multicore fiber 114, the average refractive index $n_{3g}$ of the low-refractive index layer 23g of the core element 20g is higher than the average refractive index $n_{3d}$ of the low-refractive index layers 13d and 23d of the core elements 10d and 20d.

Here, when the respective core elements 10d, 20d, and 20g are classified according to the cross-sectional structure of the core element and the refractive index, the core elements 10d, 20d, and 20g can be classified into the partial core element 20g and the other partial core elements 10d and 20d.

Due to the structure and the refractive index described above, the low-refractive index layer 23g of the partial core element 20g has larger light confinement loss in the core 21 than the low-refractive index layers 13d and 23d of the other partial core elements 10d and 20d.

In the present embodiment, as described above, although there are no boundaries between the regions of the low-refractive index layer 13g other than the low refractive index portion 5g, and the inner cladding layer 22 and the cladding 40, the boundaries are depicted by imaginary lines in FIG. 13A for better understanding.

Such a multicore fiber 113 may use a plurality of core element glass members that becomes the core 11, the inner cladding layer 12, and the low-refractive index layer 13g instead of the plurality of core element glass members that becomes the core 21, the inner cladding layer 22, and the low-refractive index layer 23e used in manufacturing of the multicore fiber 112 according to the tenth embodiment. The member that becomes the low-refractive index layer 13g may be a glass rod having a low refractive index that is disposed at the position corresponding to the low refractive index portion 5g.

According to the multicore fiber 114 of the present embodiment, just by changing the material of the low refractive index portion 5g of the specific core element 10g with the material of the low refractive index portion 5 of the core element 10e that surrounds the core element 10g, the respective core elements 10g and 10f can have the same size. Thus, the degree of freedom in design is improved.

In the present embodiment, although, since the low refractive index portion 5 is formed as a hole similarly to the eleventh embodiment, the refractive index of the low refractive index portion 5 can be further decreased, the low refractive index portion 5 is not particularly limited to a hole as long as the material of the low refractive index portion 5 has a lower refractive index than the inner cladding layer 12, the cladding 40, and the low refractive index portion 5g.

Fourteenth Embodiment

Next, a fourteenth embodiment of the present invention will be described in detail with reference to FIGS. 14A and 14B. The same or equivalent constituent elements as those of the ninth embodiment will be denoted by the same reference numerals unless otherwise particularly stated, and redundant description thereof will not be provided.

Figure 14A:
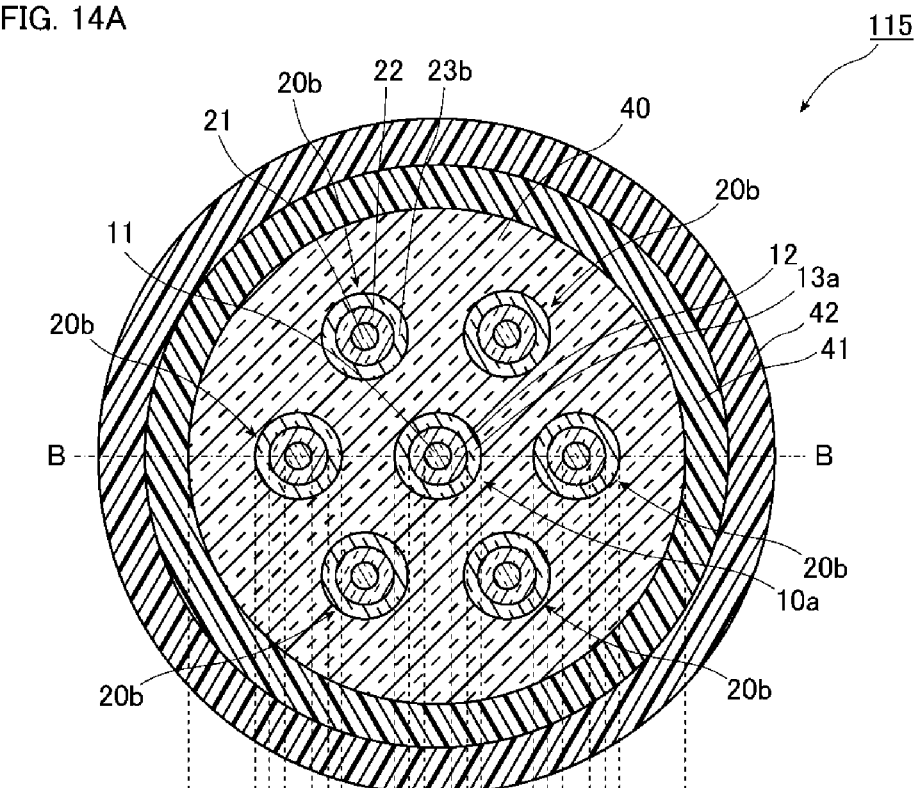
FIGS. 14A and 14B are a diagram illustrating a configuration of a multicore fiber according to a fourteenth embodiment of the present invention.
Figure 14B:
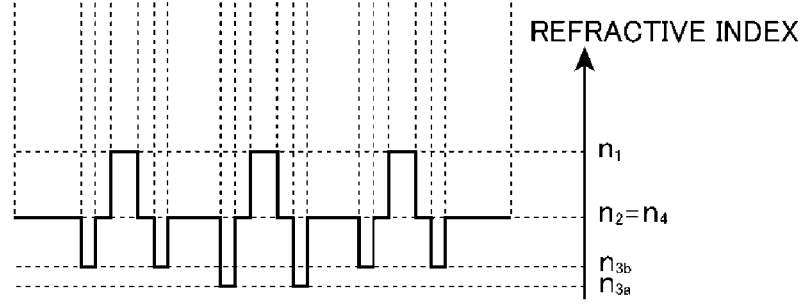

FIGS. 14A and 14B are a diagram illustrating a configuration of a multicore fiber 115 according to the fourteenth embodiment of the present invention. Specifically, FIG. 14A is a diagram illustrating a cross-sectional structure vertical to a longitudinal direction of the multicore fiber 115, and FIG. 14B is a diagram illustrating a refractive index distribution taken along a line B-B of the multicore fiber 115 illustrated in FIG. 14A.

In the multicore fiber 110 according to the ninth embodiment, although the partial core element 20b and the other partial core elements 20a of the three or more core elements that surround the specific core element 10a are arranged alternately, as illustrated in FIG. 14A, the multicore fiber 115 according to the present embodiment is different from the multicore fiber 110 according to the ninth embodiment, in that all of the three or more core elements that surround the specific core element 10a are the core elements 20b.

That is, in the multicore fiber 115 of the present embodiment, all of the core elements 20b that surround the specific core element 10a can be classified as the partial core element and the specific core element 10a can be classified as the other partial core element.

Such a multicore fiber 115 may use a core element glass member that becomes the core 21, the inner cladding layer 22, and the low-refractive index layer 23b instead of the core element glass member that becomes the core 21, the inner cladding layer 22, and the low-refractive index layer 23a used in manufacturing of the multicore fiber 110 according to the ninth embodiment.

According to the multicore fiber 115 of the present embodiment, the light in the high-order modes of the specific core element 10a can more easily escape from the vicinity of the respective core elements 20b of the three or more core elements 20b that surround the specific core element 10a. Thus, it is possible to suppress the cutoff wavelengths of the respective core elements from becoming different.

Fifteenth Embodiment

Next, a fifteenth embodiment of the present invention will be described with reference to FIGS. 15A and 15B. The same or equivalent constituent elements as those of the eleventh embodiment will be denoted by the same reference numerals unless otherwise particularly stated, and redundant description thereof will not be provided.

Figure 15A:
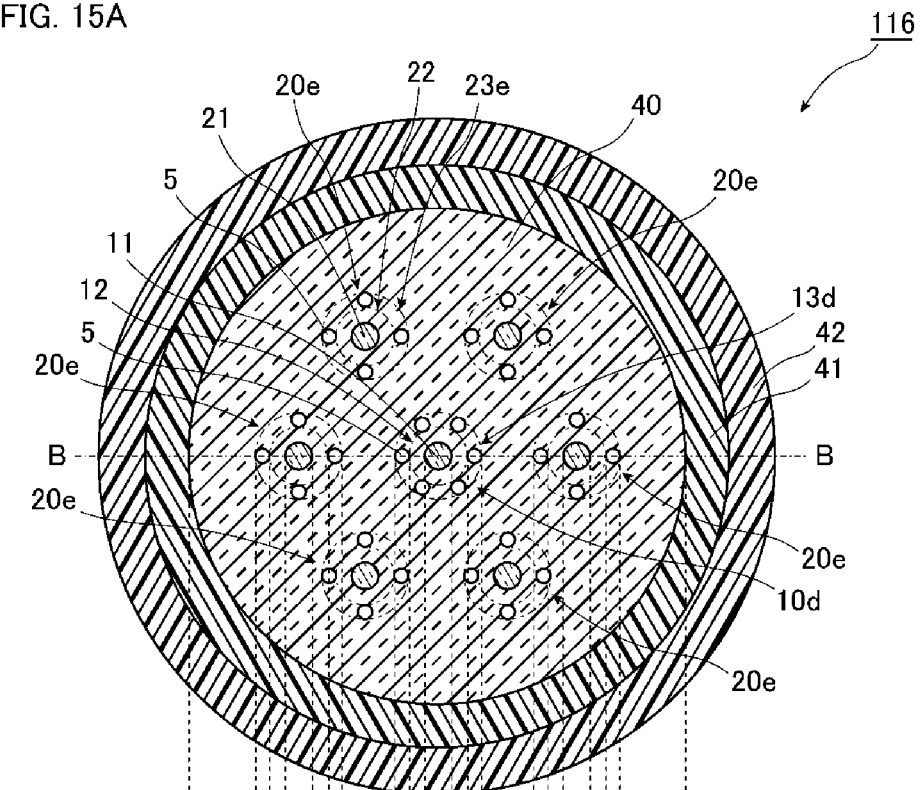
FIGS. 15A and 15B are a diagram illustrating a configuration of a multicore fiber according to a fifteenth embodiment of the present invention.
Figure 15B:
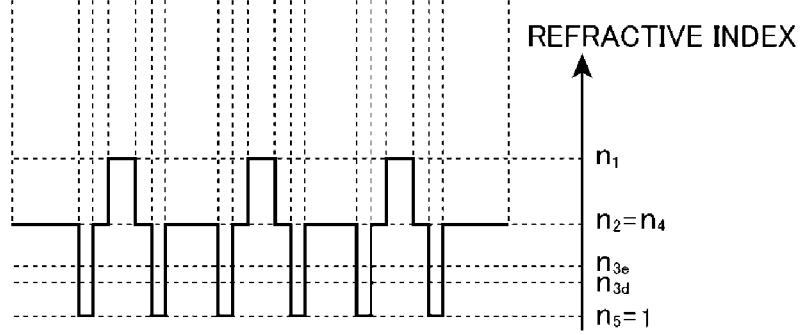

FIGS. 15A and 15B are a diagram illustrating a configuration of a multicore fiber 116 according to the fifteenth embodiment of the present invention. Specifically, FIG. 15A is a diagram illustrating a cross-sectional structure vertical to a longitudinal direction of the multicore fiber 116, and FIG. 15B is a diagram illustrating a refractive index distribution along a line B-B of the multicore fiber 116 illustrated in FIG. 15A.

In the multicore fiber 112 according to the eleventh embodiment, although the partial core element 20e and the other partial core elements 20d of the three or more core elements that surround the specific core element 10d are arranged alternately, as illustrated in FIG. 15A, the multicore fiber 116 according to the present embodiment is different from the multicore fiber 112 according to the eleventh embodiment, in that all of the three or more core elements that surround the specific core element 10d are the core elements 20e.

That is, in the multicore fiber 116 of the present embodiment, all of the core elements 20e that surround the specific core element 10d can be classified as the partial core element and the specific core element 10d can be classified as the other partial core element.

Such a multicore fiber 116 may use a core element glass member that becomes the core 21, the inner cladding layer 22, and the low-refractive index layer 23e instead of the core element glass member that becomes the core 21, the inner cladding layer 22, and the low-refractive index layer 23d used in manufacturing of the multicore fiber 112 according to the eleventh embodiment.

According to the multicore fiber 116 of the present embodiment, the light in the high-order modes of the specific core element 10d can more easily escape from the vicinity of the respective core elements 20e of the three or more core elements 20e that surround the specific core element 10d. Thus, it is possible to suppress the cutoff wavelengths of the respective core elements from becoming different.

Sixteenth Embodiment

Next, a sixteenth embodiment of the present invention will be specifically described with reference to FIGS. 16A and 16B. The same or equivalent constituent elements as those of the ninth embodiment will be denoted by the same reference numerals unless otherwise particularly stated, and redundant description thereof will not be provided.

Figure 16A:
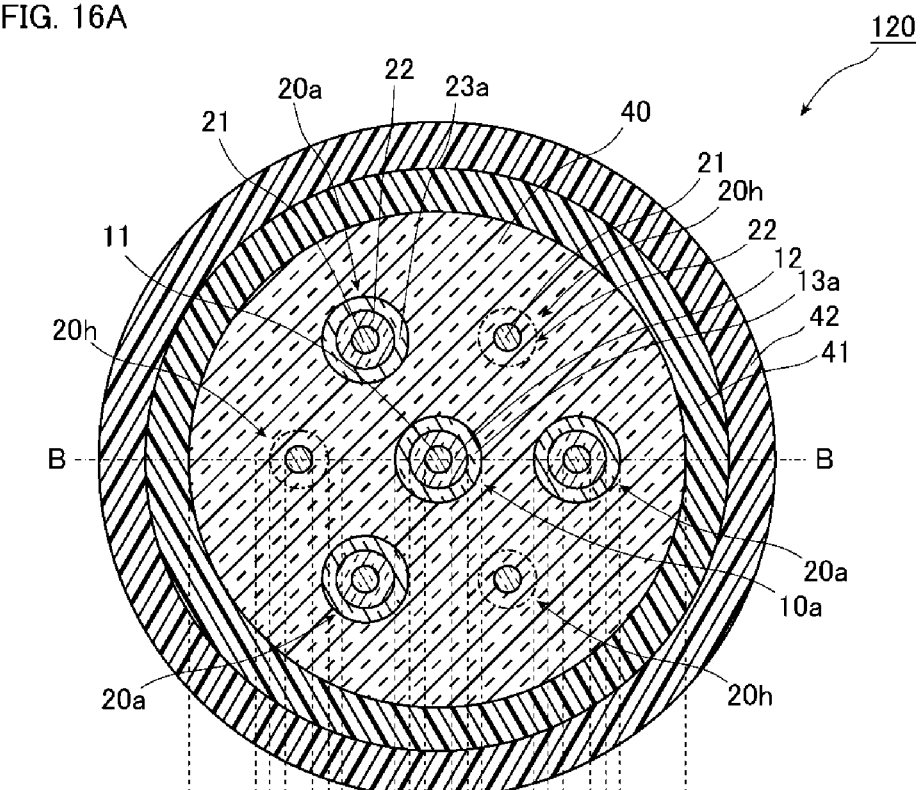
FIGS. 16A and 16B are a diagram illustrating a configuration of a multicore fiber according to a sixteenth embodiment of the present invention.
Figure 16B:
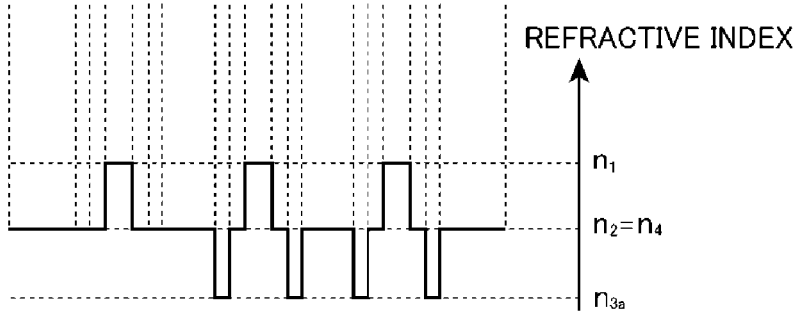

FIGS. 16A and 16B are a diagram illustrating a configuration of a multicore fiber 120 according to the sixteenth embodiment of the present invention. Specifically, FIG. 16A is a diagram illustrating a cross-sectional structure vertical to a longitudinal direction of the multicore fiber 120, and FIG. 16B is a diagram illustrating a refractive index distribution along a line B-B of the multicore fiber 120 illustrated in FIG. 16A.

As illustrated in FIG. 16A, the multicore fiber 120 according to the present embodiment is different from the multicore fiber 110 according to the ninth embodiment, in that the multicore fiber 120 includes a core element 20h that is disposed at the same position as the core element 20b instead of the partial core element 20b according to the ninth embodiment.

The core element 20h includes the same core 21 as the core 21 of the core element 20a and the same inner cladding layer 22 as the inner cladding layer 22 of the core element 20a, surrounding the circumferential surface of the core 21 but does not include the low-refractive index layer of the core element 20a. Thus, the core element 20h does not have the light confining effect of the low-refractive index layer, and light is confined in the core 21 by the light confining effect of the core 21 in the core element 20h.

In the multicore fiber 120 of the present embodiment, since the inner cladding layer 22 and the cladding 40 are formed of the same material, although there is no boundary between the inner cladding layer 22 and the cladding 40, an imaginary line that indicates the inner cladding layer 22 is depicted in FIG. 16A for better understanding. Thus, as in the multicore fiber 120 of the present embodiment, when the inner cladding layer 22 and the cladding 40 are formed of the same material, it can be considered that the core element 20h does not include the inner cladding layer 22 and the core 21 is directly disposed in the cladding 40. Moreover, in the multicore fiber 110 of the ninth embodiment, the refractive index of the low-refractive index layer 23b of the core element 20b which is the partial core element is increased up to the same refractive index as the cladding 40, whereby the core element 20b does not include the low-refractive index layer 23b, which is the same configuration as the core element 20h of the multicore fiber 120 according to the present embodiment. Thus, the multicore fiber 120 of the present embodiment has the same technical features as the multicore fiber 110 according to the ninth embodiment.

In the multicore fiber 120 of the present embodiment, since the structure of the core element 20h is different from that of the other core elements 10a and 20a, when the respective core elements 10a, 20a, and 20h are classified according to the cross-sectional structure of the core element, the core elements can be classified into the partial core element 20h and the other partial core elements 10a and 20a.

Such a multicore fiber 120 may use a core element glass member that becomes the core 21 and the inner cladding layer 22 instead of the core element glass member that becomes the core 21, the inner cladding layer 22, and the low-refractive index layer 23b used in manufacturing of the multicore fiber 110. However, in the present embodiment, since the inner cladding layer 22 and the cladding 40 have the same refractive index as described above, the inner cladding layer 22 and the cladding 40 can be formed of the same material. Thus, in the part that becomes the core element 20h, only the glass rod that becomes the core 21 is inserted in a glass member that becomes the cladding.

According to the multicore fiber 120 of the present embodiment, since the cladding 40 and the low-refractive index layers 13a and 23a of the core elements 10a and 20a are present between the core 21 of the partial core element 20h and the cores 11 and 21 of the other partial core elements 10a and 20a, it is possible to reduce crosstalk. Moreover, since the partial core element 20h does not have the effect of confining light in the core due to the low-refractive index layer, the light in high-order modes of the core element 10a can escape from the vicinity of the partial core element 20h. Thus, it is possible to prevent the cutoff wavelength of the specific core element 10a from increasing.

Moreover, since the partial core element 20h does not have the low-refractive index layer and has a simple configuration, it is possible to provide the partial core element 20h easily.

Seventeenth Embodiment

Next, a seventeenth embodiment of the present invention will be specifically described with reference to FIGS. 17A and 17B. The same or equivalent constituent elements as those of the eleventh embodiment will be denoted by the same reference numerals unless otherwise particularly stated, and redundant description thereof will not be provided.

Figure 17A:
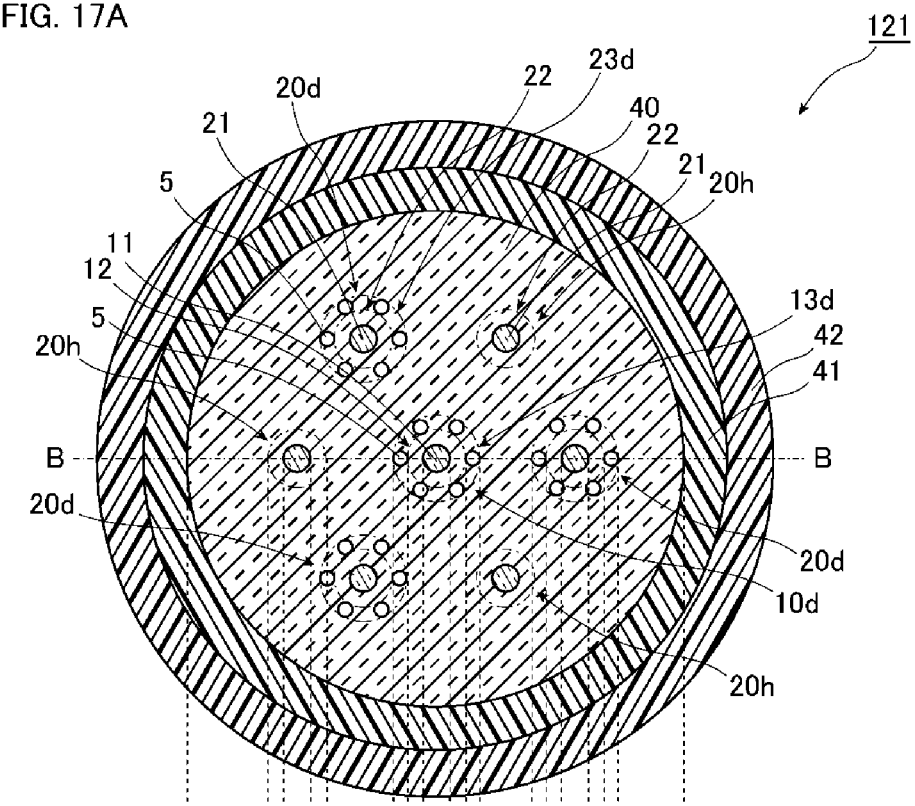
FIGS. 17A and 17B are a diagram illustrating a configuration of a multicore fiber according to a seventeenth embodiment of the present invention.
Figure 17B:
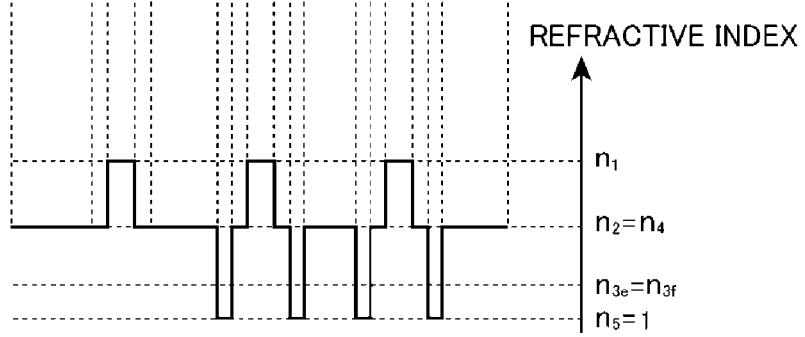

FIGS. 17A and 17B are a diagram illustrating a configuration of a multicore fiber 121 according to the seventeenth embodiment of the present invention. Specifically, FIG. 17A is a diagram illustrating a cross-sectional structure vertical to a longitudinal direction of the multicore fiber 121, and FIG. 17B is a diagram illustrating a refractive index distribution along a line B-B of the multicore fiber 121 illustrated in FIG. 17A.

As illustrated in FIG. 17A, the multicore fiber 121 according to the present embodiment is different from the multicore fiber 110 according to the eleventh embodiment, in that the same core element 20h as the core element 20h according to the sixteenth embodiment is disposed at the same position as the core element 20e instead of the partial core element 20e according to the eleventh embodiment.

In the multicore fiber 121 of the present embodiment, since the structure of the core element 20h is different from that of the other core elements 10d and 20d, when the respective core elements 10d, 20d, and 20h are classified according to the cross-sectional structure of the core element, the core elements can be classified into the partial core element 20h and the other partial core elements 10d and 20d.

Such a multicore fiber 121 may use a core element glass member that becomes the core 21 and the inner cladding layer 22 instead of the core element glass member that becomes the core 21, the inner cladding layer 22, and the low-refractive index layer 23e used in manufacturing of the multicore fiber 112. However, in the present embodiment, the inner cladding layer 22 and the cladding 40 can be formed of the same material similarly to the sixteenth embodiment. Thus, in the part that becomes the core element 20h, only the glass rod that becomes the core 21 is inserted in a glass member that becomes the cladding.

According to the multicore fiber 121 of the present embodiment, since the cladding 40 and the low-refractive index layers 13d and 23d of the core elements 10d and 20d are present between the core 21 of the partial core element 20h and the cores 11 and 21 of the other partial core elements 10d and 20d, it is possible to reduce crosstalk. Moreover, since the partial core element 20h does not have the effect of confining light in the core due to the low-refractive index layer, the light in high-order modes of the core element 10a can escape from the vicinity of the partial core element 20h. Thus, it is possible to prevent the cutoff wavelength of the specific core element 10d from increasing.

Moreover, since the partial core element 20h does not have the low-refractive index layer and has a simple configuration, it is possible to provide the partial core element 20h easily.

Eighteenth Embodiment

Next, an eighteenth embodiment of the present invention will be specifically described with reference to FIGS. 18A and 18B. The same or equivalent constituent elements as those of the sixteenth embodiment will be denoted by the same reference numerals unless otherwise particularly stated, and redundant description thereof will not be provided.

Figure 18A:
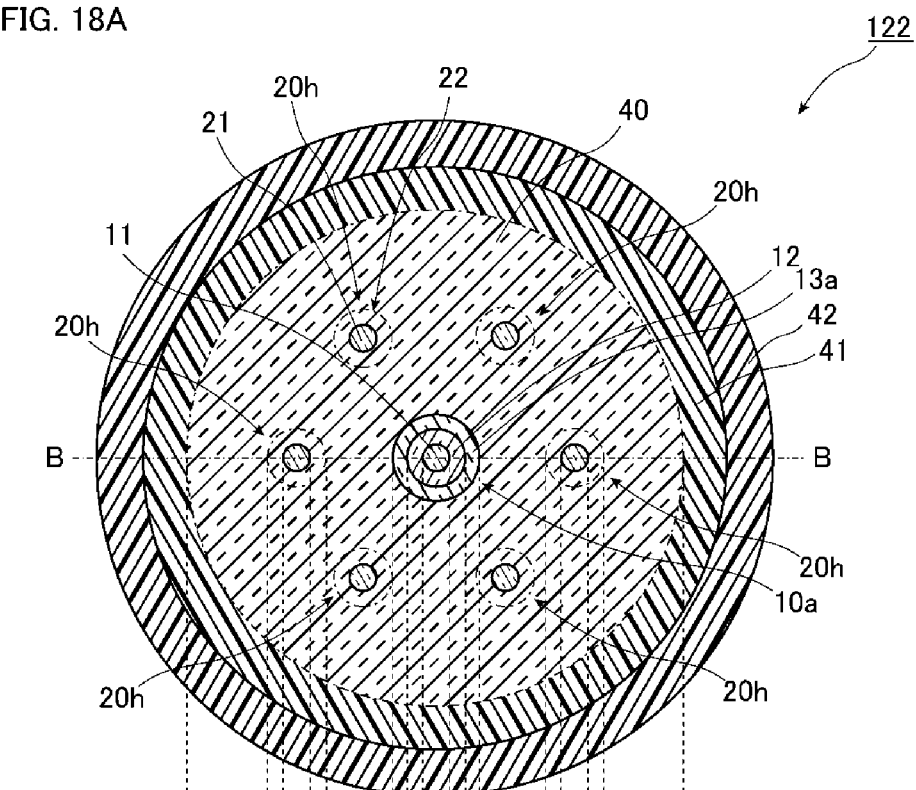
FIGS. 18A and 18B are a diagram illustrating a configuration of a multicore fiber according to an eighteenth embodiment of the present invention.
Figure 18B:
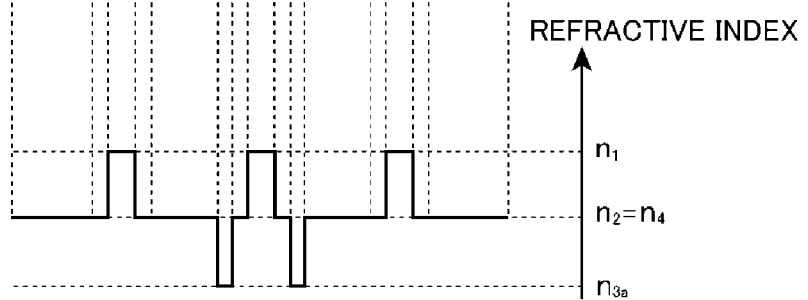

FIGS. 18A and 18B are a diagram illustrating a configuration of a multicore fiber 122 according to the eighteenth embodiment of the present invention. Specifically, FIG. 18A is a diagram illustrating a cross-sectional structure vertical to a longitudinal direction of the multicore fiber 122, and FIG. 18B is a diagram illustrating a refractive index distribution along a line B-B of the multicore fiber 122 illustrated in FIG. 18A.

In the multicore fiber 120 according to the sixteenth embodiment, although the partial core element 20h and the other partial core elements 20a of the three or more core elements that surround the specific core element 10a are arranged alternately, as illustrated in FIG. 18A, the multicore fiber 122 according to the present embodiment is different from the multicore fiber 110 according to the sixteenth embodiment, in that all of the three or more core elements that surround the specific core element 10a are the same core elements 20h as the core elements 20h of the sixteenth embodiment.

Thus, all of the core elements 20h that surround the specific core element 10a do not have the effect of confining light due to the low-refractive index layer, and the core element 20h confines light in the core 21 just by the light confining effect of the core 21. Thus, in the multicore fiber 122 of the present embodiment, all of the core elements 20h that surround the specific core element 10a can be classified as the partial core element, and the specific core element 10a can be classified as the other partial core element.

Such a multicore fiber 122 may use a core element glass member that becomes the core 21 and the inner cladding layer 22 instead of the core element glass member that becomes the core 21, the inner cladding layer 22, and the low-refractive index layer 23a used in manufacturing of the multicore fiber 120. In the present embodiment, the inner cladding layer 22 and the cladding 40 can be formed of the same material similarly to the sixteenth embodiment. Thus, in the part that becomes the core element 20h, only the glass rod that becomes the core 21 is inserted in a glass member that becomes the cladding.

According to the multicore fiber 122 of the present embodiment, since the cladding 40 and the low-refractive index layer 13a of the core element 10a are present at least between the specific core element 10a and the core elements 20h that surround the core element 10a, it is possible to reduce crosstalk at least between the core element 10a and the core element 20h. Moreover, since the partial core element 20h does not have the effect of confining light in the core due to the low-refractive index layer, the light in high-order modes of the core element 10a can escape from the vicinity of the partial core element 20h. That is, according to the present embodiment, the light in high-order mode of the specific core element 10a can escape from the entire periphery of the specific core element 10a. Thus, it is possible to prevent the cutoff wavelength of the specific core element 10a from increasing.

Nineteenth Embodiment

Next, a nineteenth embodiment of the present invention will be specifically described with reference to FIGS. 19A and 19B. The same or equivalent constituent elements as those of the seventeenth embodiment will be denoted by the same reference numerals unless otherwise particularly stated, and redundant description thereof will not be provided.

Figure 19A:
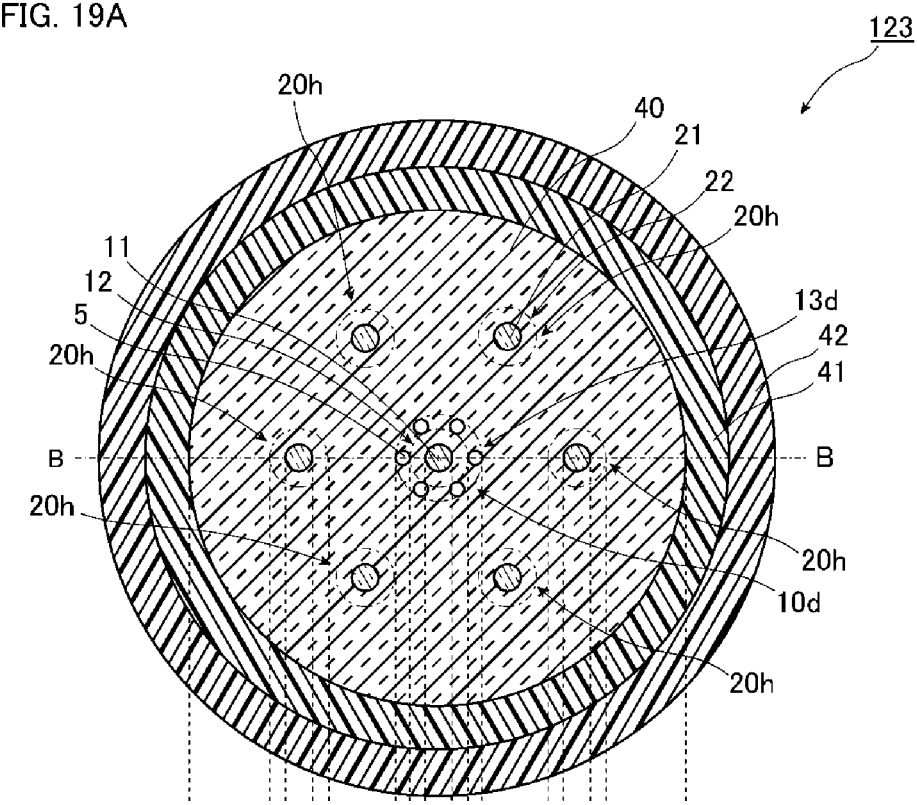
FIGS. 19A and 19B are a diagram illustrating a configuration of a multicore fiber according to a nineteenth embodiment of the present invention.
Figure 19B:
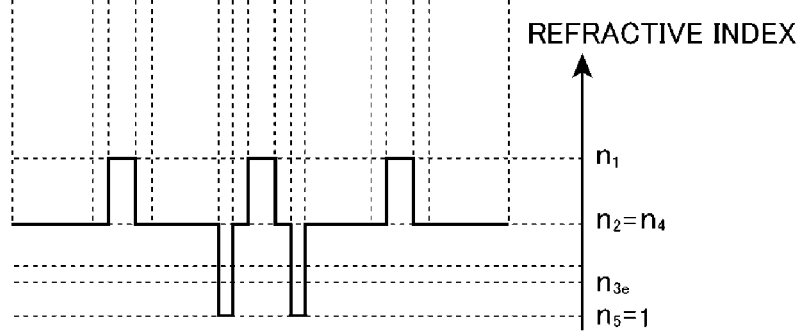

FIGS. 19A and 19B are a diagram illustrating a configuration of a multicore fiber 123 according to the nineteenth embodiment of the present invention. Specifically, FIG. 19A is a diagram illustrating a cross-sectional structure vertical to a longitudinal direction of the multicore fiber 123, and FIG. 19B is a diagram illustrating a refractive index distribution along a line B-B of the multicore fiber 123 illustrated in FIG. 19A.

In the multicore fiber 121 according to the seventeenth embodiment, although the partial core element 20h and the other partial core elements 20d of the three or more core elements that surround the specific core element 10d are arranged alternately, as illustrated in FIG. 19A, the multicore fiber 123 according to the present embodiment is different from the multicore fiber 110 according to the seventeenth embodiment, in that all of the three or more core elements that surround the specific core element 10d are the same core elements 20h as the core elements 20h of the seventeenth embodiment.

Thus, all of the core elements 20h that surround the specific core element 10d do not have the effect of confining light due to the low-refractive index layer similarly to the multicore fiber 122 of the eighteenth embodiment, and the core element 20h confines light in the core 21 just by the light confining effect of the core 21. Thus, in the multicore fiber 123 of the present embodiment, all of the core elements 20h that surround the specific core element 10d can be classified as the partial core element, and the specific core element 10d can be classified as the other partial core element.

Such a multicore fiber 123 may use a core element glass member that becomes the partial core element 20h instead of the other partial core element 20d of the seventeenth embodiment. In the present embodiment, the inner cladding layer 22 and the cladding 40 can be formed of the same material similarly to the eighteenth embodiment. Thus, in the part that becomes the core element 20h, only the glass rod that becomes the core 21 is inserted in a glass member that becomes the cladding.

According to the multicore fiber 122 of the present embodiment, since the cladding 40 and the low-refractive index layer 13d of the core element 10d are present at least between the specific core element 10d and the core elements 20h that surround the core element 10d, it is possible to reduce crosstalk at least between the core element 10d and the core element 20h. Moreover, since the partial core element 20h does not have the effect of confining light in the core due to the low-refractive index layer, the light in high-order modes of the core element 10d can escape from the vicinity of the partial core element 20h. That is, according to the present embodiment, the light in high-order mode of the specific core element 10d can escape from the entire periphery of the specific core element 10d. Thus, it is possible to prevent the cutoff wavelength of the specific core element 10d from increasing.

Twentieth Embodiment

Next, a twentieth embodiment of the present invention will be specifically described with reference to FIG. 20. The same or equivalent constituent elements as those of the ninth embodiment will be denoted by the same reference numerals unless otherwise particularly stated, and redundant description thereof will not be provided.

Figure 20:
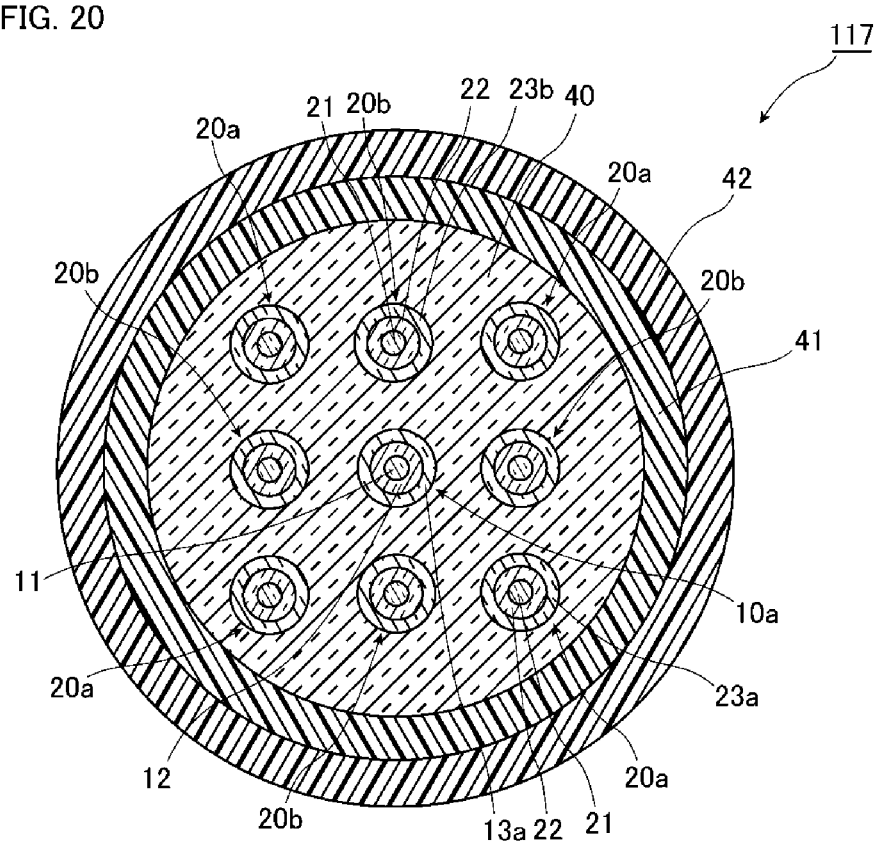
FIG. 20 is a diagram illustrating a cross-sectional structure vertical to a longitudinal direction of a multicore fiber according to a twentieth embodiment of the present invention.

FIG. 20 is a diagram illustrating a cross-sectional structure vertical to a longitudinal direction of a multicore fiber 117 according to the twentieth embodiment of the present invention.

As illustrated in FIG. 20, the multicore fiber 117 according to the present embodiment is different from the multicore fiber 100 according to the ninth embodiment, in that the number of three or more core elements that surround the specific core element 10a in the ninth embodiment is four or more, and the four or more core elements are disposed so that the centers thereof form a rectangle. Moreover, in the present embodiment, the core elements 20a are disposed at the apexes of the rectangle, and the core element 20b is disposed at each of the midpoints between the core elements 20a.

In such a multicore fiber 117, the arrangement of the plurality of core element glass members that becomes the core 21, the inner cladding layer 22, and the low-refractive index layer 23a used in manufacturing of the multicore fiber 110 and the arrangement of the plurality of core element glass members that becomes the core 21, the inner cladding layer 22, and the low-refractive index layer 23b may be the same as the arrangement of the respective core elements 20a and 20b of the multicore fiber 117 illustrated in FIGS. 16A and 16B.

Moreover, in the present embodiment, although the core elements 20a are disposed at the apexes of a rectangle, and the core element 20b is disposed at each of the midpoints between the core elements 20a, the core elements 20b may be disposed at the apexes of the rectangle, and the core element 20a may be disposed at each of the midpoints between the core elements 20b.

According to the multicore fiber 117 of the present embodiment, since the cores are disposed in a rectangular form, it is possible to easily take a matching with an optical device such as a planar waveguide and to easily input and output light to and from such an optical device.

While the present invention has been described by way of embodiments, the present invention is not limited to these embodiments.

The arrangement and the number of core elements may be changed appropriately as long as the specific core element is surrounded by three or more core elements.

Figure 21:
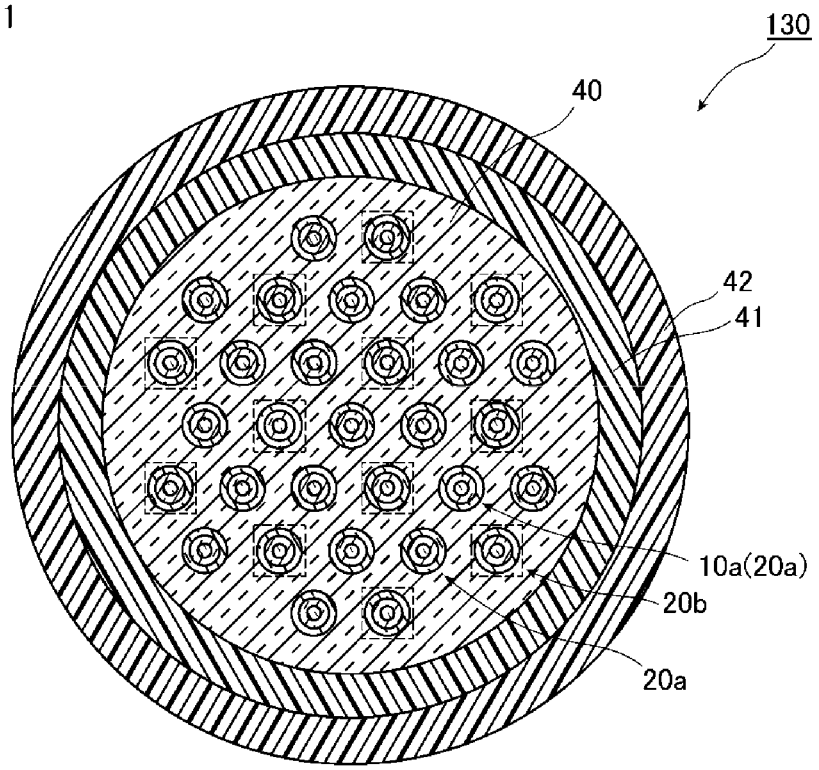
FIG. 21 is a diagram illustrating a cross-sectional structure vertical to a longitudinal direction of a multicore fiber according to a first modification of the present invention.

For example, in the above embodiments, cases where the number of specific core elements 10a to 10h is one have been described. However, the present invention is not limited to this, and the number of specific core elements 10a to 10h may be plural. Here, modifications for the cases where there are a plurality of specific core elements will be described with reference to FIGS. 21 to 23. The same or equivalent constituent elements as those of the above embodiments will be denoted by the same reference numerals unless otherwise particularly stated, and redundant description thereof will not be provided. FIG. 21 is a diagram illustrating a cross-sectional structure vertical to a longitudinal direction of a multicore fiber 130 according to a first modification of the present invention, FIG. 22 is a diagram illustrating a cross-sectional structure vertical to a longitudinal direction of a multicore fiber 131 according to a second modification of the present invention, and FIG. 23 is a diagram illustrating a cross-sectional structure vertical to a longitudinal direction of a multicore fiber 132 according to a third modification of the present invention.

In the modifications described with reference to FIGS. 21 to 23, modifications of the ninth embodiment described with reference to FIGS. 9A and 9B will be described. In FIGS. 21 to 23, the core elements 20b are surrounded by squares depicted by broken lines for better understanding. In the multicore fibers 130 to 131 of FIGS. 21 to 23, the core elements 20b surrounded by the broken-line squares have the same configuration as the core elements 20b of the ninth embodiment, and the other core elements are the same as the core elements 10a and 20a of the ninth embodiment. As described in the ninth embodiment, the core element 10 and the core element 20a have the same structure and refractive index. Here, when the plurality of core elements illustrated in FIGS. 21 to 23 is classified according to the refractive index, the plurality of core elements 10a, 20a, and 20b can be classified into the partial core element 20b and the other partial core elements 10a and 20a.

In the multicore fiber 130 according to the first modification illustrated in FIG. 21, even when any one of the core elements surrounded by six core elements other than the core element 20b is the core element 10a of the ninth embodiment, at least one of the six core elements surrounding the core element 10a is the core element 20b. Thus, at least one of the three or more core elements that surround the core element 10a which is the specific core element is a core element that has large light confinement loss in the core of the low-refractive index layer. Therefore, high-order components of light can easily escape from the specific core element 10a.

Figure 22:
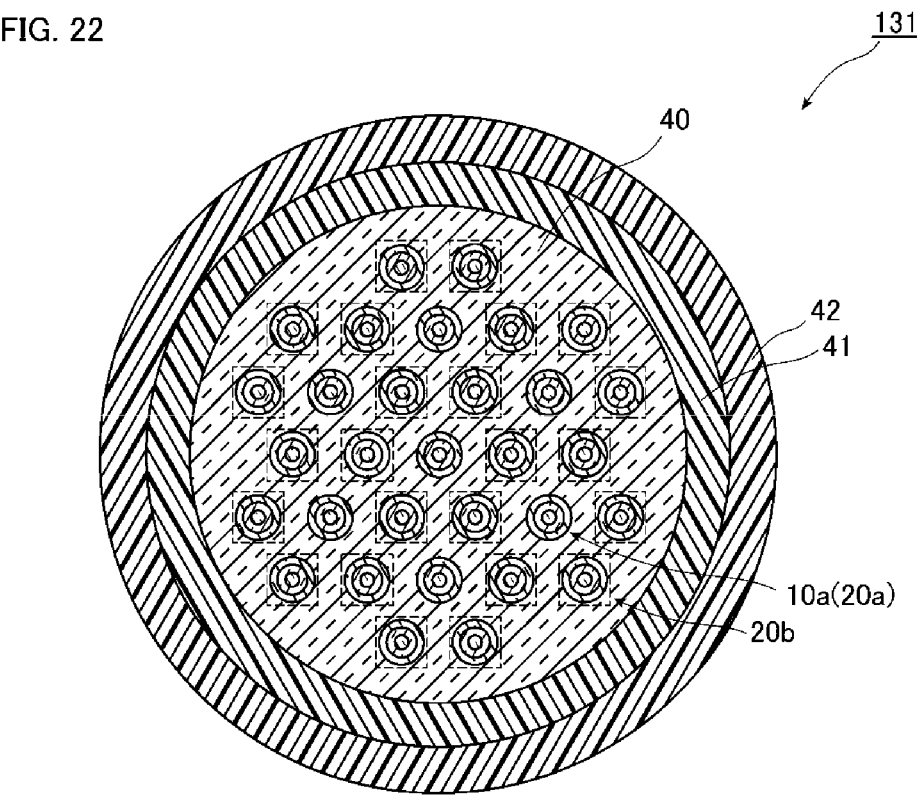
FIG. 22 is a diagram illustrating a cross-sectional structure vertical to a longitudinal direction of a multicore fiber according to a second modification of the present invention.
Figure 23:
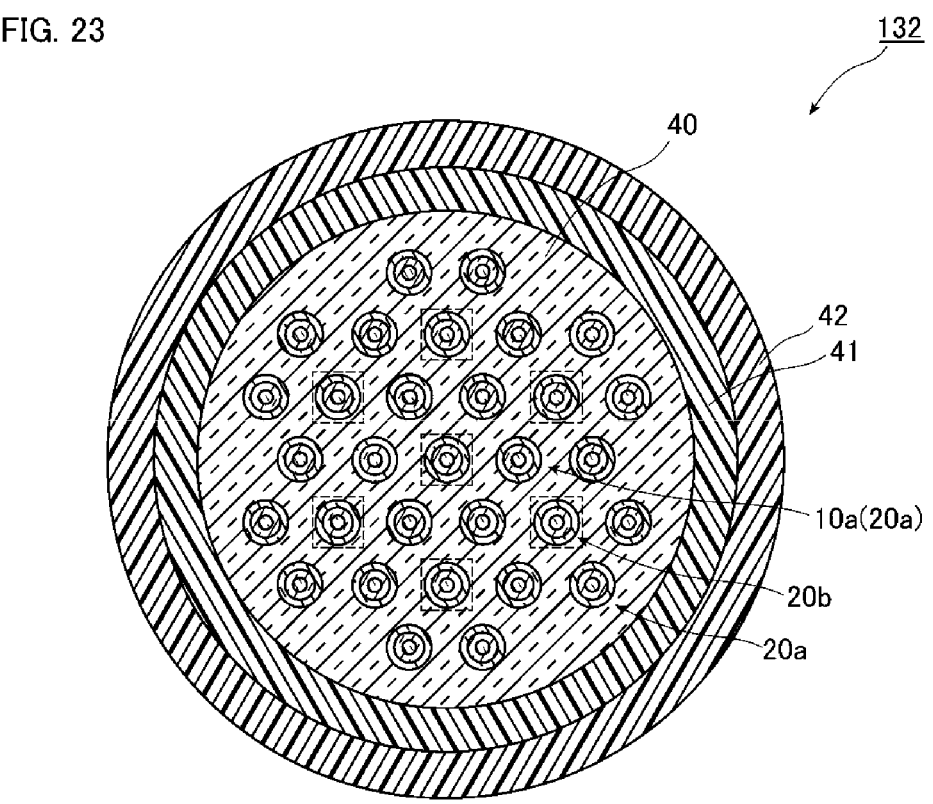
FIG. 23 is a diagram illustrating a cross-sectional structure vertical to a longitudinal direction of a multicore fiber according to a third modification of the present invention.

As illustrated in FIG. 22, in the multicore fiber 131 according to the second modification, each of the plurality of core elements 10a is surrounded by six core elements 20b.

Moreover, as illustrated in FIG. 23, in the multicore fiber 132 according to the third modification, it can be understood that each of the plurality of core elements 20b is surrounded by six core elements 20a, and it can be also understood that the plurality of core elements 10a is surrounded by three core elements 20a and three core elements 20b. Moreover, in this case, it can be understood that the core elements 20b are the core elements 10b of the first embodiment, and each of the core elements 10b is surrounded by the core elements 20a.

In any case, in the modifications of FIGS. 21 to 23, each of the plurality of specific core elements is surrounded by three or more core elements, and in the specific core element and the plurality of core elements that surround the specific core element, the low-refractive index layer of the partial core element has larger light confinement loss in the core than the low-refractive index layer of the other partial core elements. Alternatively, each of the plurality of specific core elements is the partial core element and has larger light confinement loss in the core than the other partial core elements that surround each of the specific core elements. Thus, in the multicore fibers 130 to 132 according to these modifications, it is possible to suppress the cutoff wavelength of the specific core from increasing.

The respective core elements of the respective embodiments may be appropriately combined with each other. For example, the core element 10b of the eighth embodiment may be the core element 10c of the second embodiment, the core element 10b of the eighth embodiment may be the core elements 10e, 10f, and 10g of the third to fifth embodiments, and the core element 20a of the eighth embodiment may be the core element 20d of the third embodiment. Moreover, the respective core elements 20a of the twentieth embodiment may be the core element 20d of the eleventh embodiment, the respective core elements 20b of the twentieth embodiment may be the core element 20e of the eleventh embodiment, and the core element 10a may be the core element 10d of the eleventh embodiment. The core element 10a of the ninth embodiment may be the core element 10d of the eleventh embodiment, and alternatively, the core element 10d of the eleventh embodiment may be the core element 10a of the ninth embodiment. In this manner, the core elements of the respective embodiments may be appropriately combined with each other.

In the core elements of the above embodiments, the respective cores 11 and 21 have the same diameter, and the respective inner cladding layers 12 and 22 have the same outer diameter. Moreover, in the above embodiments, the respective low-refractive index layers have the same outer diameter. However, the present invention is not limited to this, and the diameters of the cores 11 and 21, the outer diameters of the inner cladding layers 12 and 22, and the outer diameters of the low-refractive index layers may be different in the respective core elements, and in particular, it is preferable that the cores 11 and 21 of the adjacent core elements have different diameters. For example, the diameter of the core 21 of the three or more core elements that surround the specific core element disposed at the center may be different by approximately 1% from that of the core 11 of the central core element, and the diameter of the core 21 of the core elements on the outer circumference may be different by 1% to 2% from the diameter of the core 21 of the adjacent core elements. In this manner, even when the diameters of the cores 11 and 21 of the respective core elements are physically slightly different from each other, the diameters of the respective cores 11 and 21 almost do not change, so that the light propagating through the cores 11 and 21 has approximately the same optical characteristics. Moreover, by changing the diameters of the cores 11 and 21 of the adjacent core elements in this manner, it is possible to further reduce crosstalk.

In the above embodiments, the respective cores 11 and 21 of the respective core elements have the same refractive index $n_1$, and the inner cladding layers 12 and 22 have the same refractive index $n_2$. However, the respective cores 11 and 21 of the respective core elements may have different refractive indices $n_1$, and the respective inner cladding layers 12 and 22 may have different refractive indices $n_2$. In particular, it is preferable that the cores 11 and 21 of the adjacent core elements have different refractive indices. For example, the refractive index of the core 21 of the three or more core elements that surround the specific core element located at the center may be different by approximately 0.01% from that of the core 11 of the specific core element, and the refractive index of the core 21 of the three or more core elements that surround the specific core element may be different by 0.01% to 0.02% from the refractive index of the core 21 of the adjacent core elements. In this manner, even when the refractive indices of the cores 11 and 21 of the respective core elements are physically slightly different from each other, the optical characteristic of the core 11 hardly have any difference from the optical characteristic of the core 21 in terms of the light propagating through the cores 11 and 21. Moreover, by changing the refractive indices of the cores 11 and 21 of the adjacent core elements in this manner, it is possible to further reduce crosstalk.

INDUSTRIAL APPLICABILITY

As described above, a multicore fiber capable of suppressing the cutoff wavelength of a specific core from increasing while reducing inter-core crosstalk is provided. According to the multicore fiber of the present invention, it is possible to easily perform single-mode communication in a state where crosstalk is reduced.

DESCRIPTION OF REFERENCE NUMERALS 10a to 10h: core element
11: core
12: inner cladding layer
13a to 13g: low-refractive index layer
5, 5f, 5g: low refractive index portion
20a to 20h: core element
21: core
22: inner cladding layer
23a to 23g: low-refractive index layer
40: cladding
41: inner protective layer
42: outer protective layer
100 to 107, 110 to 117, 120 to 123, 130 to 132: multicore fiber

The invention claimed is:

1. A multicore fiber comprising:
a cladding; and
a plurality of core elements provided in the cladding, each of the plurality of core elements including a core, an inner cladding layer that surrounds the core, and a low-refractive index layer that surrounds the inner cladding layer and has a lower average refractive index than the cladding and the inner cladding layer, wherein
the plurality of core elements is arranged so as to surround a specific core element by three or more core elements, and the plurality of core elements includes a first core element having a first low-refractive index layer and a second core element having a second low-refractive index layer, and
the first low-refractive index layer of the first core element has larger light confinement loss in the core than the second low-refractive index layer of the second core element.

2. The multicore fiber according to claim 1, wherein the low-refractive index layer is formed of a material having a lower refractive index than the cladding and the inner cladding layer.

3. The multicore fiber according to claim 2, wherein the first low-refractive index layer of the first core element has a higher refractive index than the second low-refractive index layer of the second core element.

4. The multicore fiber according to claim 2, wherein the first low-refractive index layer of the first core element is thinner than the second low-refractive index layer of the second core element.

5. The multicore fiber according to claim 1, wherein the low-refractive index layer includes a plurality of low refractive index portions which has a lower refractive index than the cladding and the inner cladding layer and surrounds the inner cladding layer.

6. The multicore fiber according to claim 5, wherein the number of low refractive index portions of the first core element is smaller than the number of low refractive index portions of the second core element.

7. The multicore fiber according to claim 5, wherein the low refractive index portions of the first core element have a smaller cross-sectional area than the low refractive index portions of the second core element.

8. The multicore fiber according to claim 5, wherein the low refractive index portions of the first core element have a higher refractive index than the low refractive index portions of the second core element.

9. The multicore fiber according to claim 5, wherein at least one of the low refractive index portions of the plurality of core elements is disposed on a straight line that connects the core of own core element and the cores of the other core elements.

10. The multicore fiber according to claim 1, wherein the first core element is the specific core element.

11. The multicore fiber according to claim 1, wherein the first core element is at least one of the three or more core elements that surround the specific core element.

12. The multicore fiber according to claim 11, wherein the first core element includes all of the three or more core elements that surround the specific core element.

13. The multicore fiber according to claim 11, wherein the first core element and the second core element are alternately arranged in the three or more core elements that surround the specific core element.

14. The multicore fiber according to claim 1, wherein each of the plurality of core elements other than the first core element is the second core element.

15. A multicore fiber comprising:
a cladding; and
a plurality of core elements provided in the cladding, wherein
the plurality of core elements includes a first core element and a second core element and is arranged so as to surround a specific core element by three or more core elements,
the second core element includes a core, an inner cladding layer that surrounds the core, and a low-refractive index layer that surrounds the inner cladding layer and has a lower average refractive index than the cladding and the inner cladding layer, and
the first core element includes a core and does not include the low-refractive index layer.

16. The multicore fiber according to claim 15, wherein the low-refractive index layer is formed of a material having a lower refractive index than the cladding and the inner cladding layer.

17. The multicore fiber according to claim 15, wherein the low-refractive index layer includes a plurality of low refractive index portions that has a lower refractive index than the cladding and the inner cladding layer and surrounds the inner cladding layer.

18. The multicore fiber according to claim 17, wherein at least one of the low refractive index portions is disposed on a straight line that connects the core of own core element and the cores of the other core elements.

* * * * *